United States Patent [19]
Kifuku

[11] Patent Number: 6,029,767
[45] Date of Patent: Feb. 29, 2000

[54] ELECTRIC POWER STEERING SYSTEM

[75] Inventor: Takayuki Kifuku, Tokyo, Japan

[73] Assignee: Mitsubishi Denki Kabushiki Kaisha, Tokyo, Japan

[21] Appl. No.: 09/070,768

[22] Filed: May 1, 1998

[30] Foreign Application Priority Data

Nov. 18, 1997 [JP] Japan ................................. 9-317357

[51] Int. Cl.$^7$ .................................................. B62D 5/04
[52] U.S. Cl. ........................................... 180/443; 701/41
[58] Field of Search .................................. 180/443, 446; 701/36, 41, 42, 43, 44

[56] References Cited

U.S. PATENT DOCUMENTS

| | | | |
|---|---|---|---|
| 4,756,375 | 7/1988 | Ishikura et al. | 180/79.1 |
| 4,837,690 | 6/1989 | Morishita et al. | 364/424.05 |
| 4,869,333 | 9/1989 | Morishita et al. | 180/79.1 |
| 4,977,507 | 12/1990 | Matsuoka et al. | 364/424.05 |
| 5,000,278 | 3/1991 | Morishita | 180/79.1 |
| 5,040,630 | 8/1991 | Morishita et al. | 180/79.1 |
| 5,341,891 | 8/1994 | Wada et al. | 18/79.1 |
| 5,361,210 | 11/1994 | Fu | 364/424.05 |
| 5,602,735 | 2/1997 | Wada | 364/424.051 |
| 5,659,472 | 8/1997 | Nishino et al. | 364/424.051 |
| 5,740,040 | 4/1998 | Kifuku et al. | 364/424.051 |
| 5,839,537 | 11/1998 | Nishino et al. | 180/443 |

FOREIGN PATENT DOCUMENTS

| | | |
|---|---|---|
| 61-71275 | 4/1986 | Japan . |
| 7-33040 | 2/1995 | Japan . |

*Primary Examiner*—Paul N. Dickson
*Assistant Examiner*—Daniel Yeagley
*Attorney, Agent, or Firm*—Sughrue, Mion, Zinn, Macpeak & Seas, PLLC

[57] ABSTRACT

When a motor terminal voltage detector circuit fails, it is impossible to calculate a motor angular speed estimate, so a current is supplied to a steering-assist motor regardless of a driver's steering state, thus leading to abnormality in control of the steering force due to an electric power steering system. According to a first motor target current which is determined on the basis of a detected driver's steering force value and a second motor target current which is determined on the basis of a counter electromotive voltage across the motor, a third motor target current to be supplied to the motor is determined, and also an upper limit is set for the second or third target current. Also, failure of circuits necessary for calculating a counter electromotive voltage across the motor is detected.

18 Claims, 17 Drawing Sheets

ELECTRIC POWER STEERING SYSTEM

BACKGROUND OF THE INVENTION

1. Field of the Invention

The present invention relates to an electric power steering system that can conduct an appropriate fail-safe processing by setting an upper limit of a current or voltage which is supplied to a motor and controls the motor which is improved in steering feeling.

2. Description of the Related Art

FIG. 15 is a block diagram schematically showing the structure of a controller in a conventional electric power steering system as disclosed in Japanese Patent Unexamined Publication No. Hei 8-175404.

The conventional electric power steering system includes a power source in the form of a motor 1 for assisting a steering force or effort of a driver, a torque sensor 2 for detecting the steering force upon steering of the driver, and an input interface (hereinafter simply referred to as "I/F") 3 for inputting a detection signal from the torque sensor 2 to an A/D converter 21 which will be described later. The interface 3 is designed to conduct d.c. amplification and phase compensation.

The electric power steering system 1 also includes a vehicle speed sensor 4 for detecting a travel speed of a vehicle, an input I/F 5 for inputting a signal from the vehicle speed sensor 4 to an I/O port 20 which will be described later, a motor current detector circuit 6 for converting a current (i.e., motor current) supplied to the motor 1 into a predetermined voltage so as to input it to an A/D converter 21 which will be described later, and a motor terminal voltage detector circuit 9 for converting a voltage level of a terminal voltage of the motor 1 and inputting the converted terminal voltage to the A/D converter 21, the motor terminal voltage detector circuit 9 also having a low pass characteristic that allows a frequency band lower than a PWM carrier frequency for driving the motor 1 to pass therethrough.

The motor current detector circuit 6 includes a current detection resistor 7 that converts the motor current into a voltage, and an amplifier circuit 8 for amplifying a voltage across the current detection resistor 7.

The motor terminal voltage detector circuit 9 includes resistors 10a to 10f and capacitors 11a, 11b.

Also, an H-type bridge circuit 12 for driving the motor 1 is made up of power MOSFETs 13a to 13d.

A driver circuit 14 is made up of FET drivers 14a to 14d for driving the power MOSFETs 13a to 13d, respectively. Also, a microcomputer 15 that serves as a controller includes a CPU 16, a ROM 17 for storing therein a control program, etc., a RAM 18 for temporarily storing data and the like therein, a PWM timer 19 for generating a pulse signal to drive the motor 1, an I/O port 20a, an I/O port 20b, an A/D converter 21 and a timer 22 which is used for management of a control period, etc.

The PWM timer 19 is connected with input terminals of the FET driver 14a and the FET driver 14c.

Also, the I/O port 20a is connected with the FET drivers 14b and 14d, and similarly, the I/O port 20b is connected with the vehicle speed sensor 4 through the vehicle speed sensor input I/F 5.

The A/D converter 21 is connected with output terminals of the motor current detector circuit 6 and the motor terminal voltage detector circuit 9, and also connected with an output terminal of the torque sensor 2 through the torque sensor input I/F 3.

FIG. 16 is a functional block diagram showing the controller in the conventional electric power steering system shown in FIG. 15.

As shown in FIG. 16, the controller 15 functionally includes a steering force assisting current arithmetic operating means 23, a current control means 24, a motor angular speed arithmetic operating means 25, a motor angular acceleration arithmetic operating means 26, a Coulomb's friction compensating current arithmetic operating means 27, a viscosity friction compensating current arithmetic operating means 28, and an inertia compensating current arithmetic operating means 29. The functions of those means are obtained when the CPU 16 executes the control program stored in the ROM 17.

The assisting current arithmetic operating means 23 that arithmetically operates or calculates the motor current for statically assisting the steering force is designed to arithmetically operate or calculate a steering force assisting current target value Is on the basis of a detected steering force value Vt corresponding to a steering force which has been detected by the torque sensor 2 and a detected vehicle speed value Vs corresponding to a vehicle speed which has been detected by the vehicle speed sensor 4.

The current control means 24 for controlling a current flowing through the motor 1 is designed to conduct feedback control in such a manner that a detected motor current value $Ia^{sns}$, which has been detected by the motor current detector circuit 6, coincides with a motor target current Ia1, and to arithmetically operate or calculate a voltage Va1 which is applied to the motor 1.

The motor angular speed arithmetic operating means 25 for arithmetically operating or calculating the angular speed of the motor 1 is designed to arithmetically operate or calculate a motor angular speed estimate ω on the basis of a motor terminal voltage $Va^{sns}$, which is obtained from motor terminal voltages V12 and V22 detected by the motor terminal voltage detector circuit 9, and the motor current $Ia^{sns}$ detected by the motor current detector circuit 6.

The motor angular speed arithmetic operating means 26 is designed to arithmetically operate or calculate a motor angular acceleration estimate dω/dt on the basis of the motor angular speed estimate ω which has been arithmetically operated or calculated by the motor angular speed arithmetic operating means 25.

The Coulomb's friction compensating current arithmetic operating means 27 arithmetically operating or calculating the motor current for compensating the Coulomb's friction of a steering system is designed to arithmetically operate or calculate a Coulomb's friction compensating current target value Ic on the basis of the motor angular speed estimate ω and the vehicle speed Vs which has been detected by the vehicle speed sensor 4.

The viscosity friction compensating current arithmetic operating means 28 arithmetically operating or calculating the motor current for compensating the viscosity friction of the steering system is designed to arithmetically operate or calculate a viscosity friction compensating current target value Id on the basis of the motor angular speed estimate ω and the vehicle speed Vs which has been detected by the vehicle speed sensor 4.

The inertia compensating current arithmetic operating means 29 arithmetically operating or calculating the motor current for compensating the inertia moment of the steering system is designed to arithmetically operate or calculate an inertia compensating current target value Ij on the basis of the motor angular acceleration estimate dω/dt and the vehicle speed Vs which has been detected by the vehicle speed sensor 4.

Now, the operation of the above-mentioned conventional electric power steering system will be described.

When a steering wheel is steered to generate a steering torque in the steering system, the torque sensor 2 detects the steering torque and output a corresponding voltage value Vt to the CPU 16 through the A/D converter 21.

After this, processing is conducted according to the control program, and the steering force assisting current arithmetic operating means 23 arithmetically operates or calculates the steering force assisting current target value Is, for example, as shown in FIG. 17, on the basis of the detected vehicle speed value Vs and the detected steering force value Vt to supply its result to the current control means 24 as the motor target current Ia1.

The current control means 24 conducts feedback control so as to make the detected motor current value $Ia^{sns}$ coincide with the motor target current Ia1, arithmetically operates the voltage Va1 which is applied to the motor 1, and in order to apply Va1 to the motor 1, gives signals from the PWM timer 19 and the I/O port 20a to the H-type bridge circuit 12 to drive the motor 1.

Upon driving the motor 1, the voltages V12 and V22 at the respective terminals of the motor 1 are detected by the motor terminal voltage detector circuit 9, and then inputted to the CPU 16 through the A/D converter 21.

After that, processing is conducted according to programs, and the CPU 16 arithmetically operates or calculates the detected motor terminal voltage value $Va^{sns}$ as $Va^{sns}=V12-V22$, and then gives this value $Va^{sns}$ to the motor angular speed arithmetic operating means 25.

The motor angular speed arithmetic operating means 25 arithmetically operates or calculates the motor angular speed estimate ω on the basis of the detected motor terminal voltage value $Va^{sns}$ and the detected motor current value $Ia^{sns}$, and gives this value ω to the motor angular acceleration arithmetic operating means 26, the Coulomb's friction compensating current arithmetic operating means 27 and the viscosity friction compensating current arithmetic operating means 28.

The motor angular acceleration arithmetic operating means 26 obtains the motor angular acceleration estimate dω/dt by differentiating the motor angular speed estimate ω, and gives this value dω/dt to the inertia compensating current arithmetic operating means 29.

The Coulomb's friction compensating current arithmetic operating means 27 arithmetically operates or calculated the target value Ic of the Coulomb's friction compensating current from the vehicle speed Vs and the motor angular speed estimate ω, for example, on the basis of a characteristic shown in FIG. 18, and then adds the target value Ic to the steering force assisting current target value Is.

The Coulomb's friction compensating current target value Ic is to improve the return of the steering wheel which is particularly deteriorated at low speed.

The viscosity friction compensating current arithmetic operating means 28 arithmetically operates or calculates the target value Ia1 of the viscosity friction compensating current from the motor angular speed estimate vω, for example, on the basis of a characteristic shown in FIG. 19, to add it to the above steering force assisting current target value Is.

The target value Id of the viscosity friction compensating current gives a viscosity feeling to the driver's steering feeling, and also improves the convergence when returning the steering wheel to a home or neutral position, which would be degraded particularly at high speed.

The inertia compensating current arithmetic operating means 29 arithmetically operates or calculates the target value Ij of the inertial compensating current that has an effect of reducing such an inertia feeling that the steering force is increased particularly at the time of reversing a steering direction due to an influence of the inertia moment of the motor 1, from the motor angular speed estimate dω/dt, for example, on the basis of a characteristic shown in FIG. 20, and then adds it to the above steering force assisting current target value Is.

In this way, the motor target current Ia1 is obtained from the following equation based on the steering force assisting current target value Is, the Coulomb's friction compensating current target value Ic, the viscosity friction compensating current target value Id and the inertia compensating current target value Ij.

$$Ia1=Is+Ic+Id+Ij \qquad (1)$$

The value Ia1 thus calculated is given to the current control means 24 so as to control the motor current, likewise.

Now, the motor angular speed arithmetic operating means 25 will be described in more detail.

Provided that the motor 1 is a separately excited d.c. motor, an equivalent circuit of an armature can be expressed as shown in FIG. 21. In this figure, Ra is an armature resistor, La is an armature inductance, Ve is a motor inductive voltage, Va is a motor terminal voltage, and Ia is a motor current.

In FIG. 21, if transient terms based on the armature inductance La are ignored, the following equation is satisfied.

$$Va=Ia \times Ra+Ve \qquad (2)$$

Here, Ve is expressed as follows.

$$Ve=Ke \times m \qquad (3)$$

where Ke is a motor inductive voltage constant, and m is a motor angular speed.

From the equations (2) and (3) above, the following equation is obtained.

$$m=(Va-Ia \times Ra)/Ke \qquad (4)$$

Since Ra and Ke are constants, and since Va and Ia can be replaced by detected values, a motor angular speed estimate ω can be calculated by the following equation.

$$\omega=(Va^{sns}-Ia^{sns} \times Ra)/Ke \qquad (5)$$

where $Va^{sns}$ is a detected motor terminal voltage value, and $Ia^{sns}$ is a detected motor current value).

Thus, with the conventional electric power steering system as structured above, the motor angular speed estimate is arithmetically operated or calculated on the basis of the motor terminal voltage.

For this reason, if the motor terminal voltage detector circuit is in failure, then the motor angular speed estimate is not correctly arithmetically operated whereby a current is allowed to flow in the motor regardless of the steering state of the driver. As a result, there arises such a problem that abnormality takes place in the control of the steering force by means of the electric power steering system.

SUMMARY OF THE INVENTION

The present invention is intended to solve the above problems, and therefore an object of the present invention is to provide an electric power steering system of the character described which is capable of preventing the driver's steering operation (i.e., manipulation of a steering wheel) from being adversely affected even if a circuit in a control system is in failure, and at the same time of taking an appropriate fail-safe measure when it is determined that the circuit in the control system is in failure.

In order to achieve the above object, according to a first aspect of the present invention, there is provided an electric power steering system comprising: first arithmetic calculating means for arithmetically calculating a first motor target current on the basis of a detected value of a driver's steering force; second arithmetic calculating means for arithmetically calculating a second motor target current which is determined on the basis of a counter electromotive voltage across a motor which assist the driver's steering force; third arithmetic calculating means for arithmetically calculating a third motor target current to be supplied to the motor for assisting the driver's steering force on the basis of the first motor target current and the second motor target current; and maximum current setting means for setting an upper limit for the second or third motor target current.

In a preferred form of the first aspect of the invention, the maximum current setting means varies the upper limit for the second motor target current on the basis of the detected value of the driver's steering force.

In another preferred form of the first aspect of the invention, the upper limit for the motor current is replaced by a corresponding upper limit for a voltage supplied to the motor.

In accordance with a second aspect of the present invention, there is provided an electric power steering system comprising: first control means for determining a third motor target current to be supplied to a motor which assists a driver's steering force, based on a first motor target current which is determined on the basis of a detected value of the driver's steering force and a second motor target current which is determined on the basis of a counter electromotive voltage across the motor, so as to control the motor; and second control means for controlling the motor on the basis of the detected value of the driver's steering force; wherein a first upper limit and a second upper limit for the motor current are set in the first and second control means, respectively, with the first upper limit being equal to or less than the second upper limit.

In a preferred form of the second aspect of the invention, the upper limits for the motor current are replaced by corresponding upper limits for a voltage supplied to the motor.

In another preferred form of the second aspect of the invention, the motor current or the motor voltage is allowed to exceed the upper limits within a predetermined period of time.

In accordance with a third aspect of the present invention, there is provided an electric power steering system comprising: first arithmetic calculating means for arithmetically calculating a first motor target current on the basis of a detected value of a driver's steering force; second arithmetic calculating means for arithmetically calculating a second motor target current on the basis of a counter electromotive voltage across a motor which assists the driver's steering force; third arithmetic calculating means for arithmetically calculating a third motor target current to be supplied to the motor on the basis of the first motor target current and the second motor target current; and failure determining means for determining a failure when a terminal voltage of the motor or a difference between the respective terminal voltages thereof is deviated from a predetermined range.

In a preferred form of the third aspect of the invention, the failure determining means determines a failure when the motor terminal voltage or the difference between the respective terminal voltages of the motor is deviated from the predetermined voltage range for a predetermined period of time or longer.

In another preferred form of the third aspect of the invention, the failure determining means does not conduct failure determination when a voltage applied to the motor is deviated from a predetermined voltage range.

In a further preferred form of the third aspect of the invention, the failure determining means prohibits the energization of the motor when a voltage applied to the motor is deviated from a predetermined voltage range.

In a further preferred form of the third aspect of the invention, the failure determining means varies the predetermined voltage range in failure determination according to a voltage supplied to the motor.

In a further preferred form of the third aspect of the invention, the failure determining means sets the upper limit for the second or third motor target current to nearly zero and holds the upper limit as set when the failure determining means determines a failure.

In a further preferred form of the third aspect of the invention, the maximum current setting means sets an upper limit for the motor voltage to nearly zero and holds the upper limit as set when the failure determining means determines a failure.

In a further preferred form of the third aspect of the invention, the failure determining means further includes a motor driver circuit and switch means disposed between a power supply and ground, and opens the switch means and holds this state when the failure determining means determines a failure.

In a further preferred form of the third aspect of the invention, the failure determining means further includes clutch means for coupling the motor to the steering system or decoupling the motor from the steering system, wherein the failure determining means decouples the clutch means and holds this state when the failure determining means determines a failure.

In a further preferred form of the third aspect of the invention, the failure determining means further includes alarm means for alarming to the driver, wherein the failure determining means raises an alarm to the driver when the failure determining means determines a failure.

BRIEF DESCRIPTION OF THE DRAWINGS

The above and other objects, features and advantages of the present invention will become more fully apparent from the following detailed description of preferred embodiments of the invention taken with the accompanying drawings in which.

DESCRIPTION OF THE PREFERRED EMBODIMENTS

Now, preferred embodiments of the present invention will be described in detail while referring to the accompanying drawings. Parts identical with or corresponding to those in the conventional system are denoted by same reference symbols, and their description will be omitted.

First Embodiment

Figure 1:
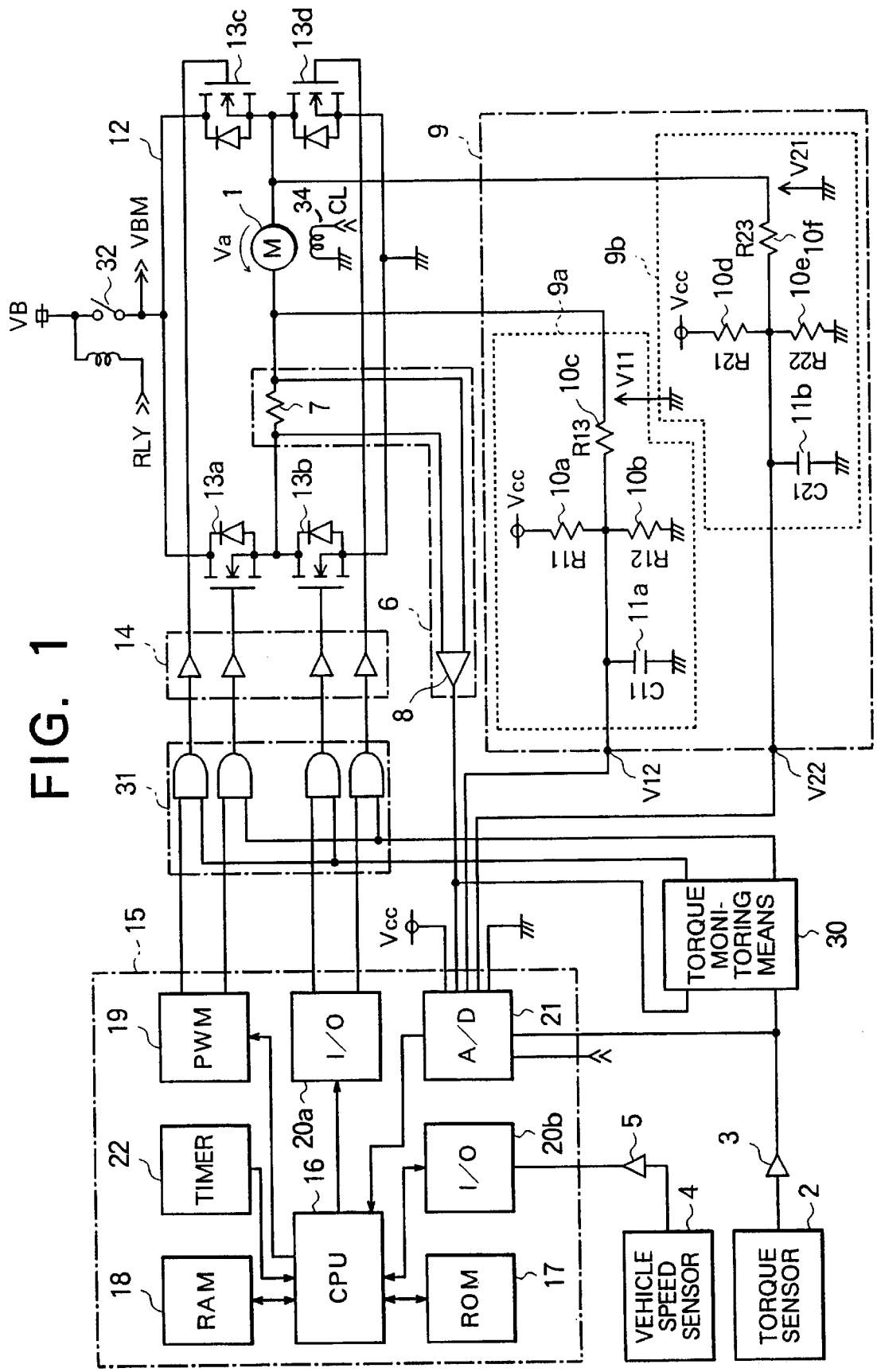
FIG. 1 is a circuit diagram schematically showing the structure of an electric power steering system according to the present invention.
Figure 2:
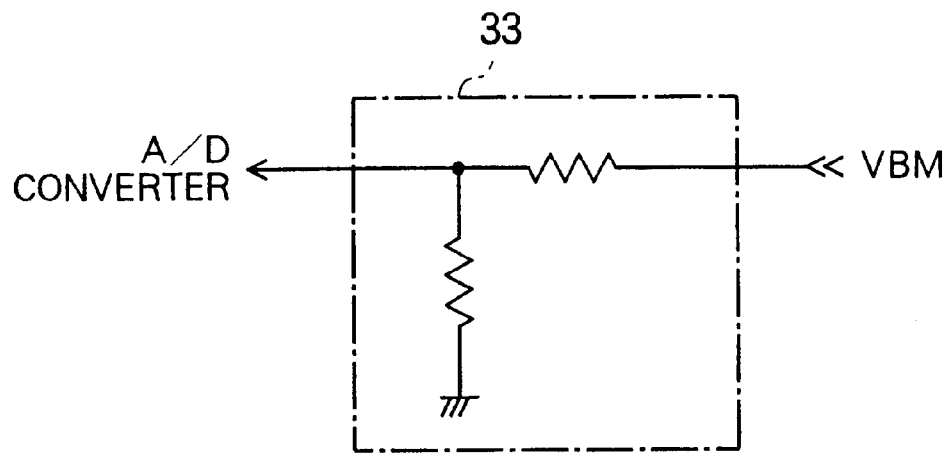
FIG. 2 is a circuit diagram schematically showing an essential portion of the electric power steering system according to the present invention.
Figure 3:
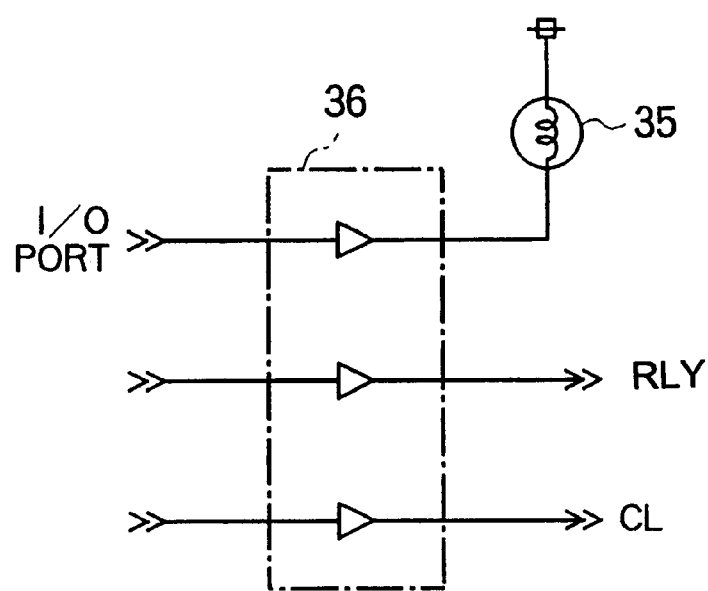
FIG. 3 is a circuit diagram schematically showing another essential portion of the electric power steering system according to the present invention.

FIG. 1 is a circuit diagram schematically showing the structure of an electric power steering system according to a first embodiment of the present invention. FIGS. 2 and 3 are circuit diagrams schematically showing essential portions of the electric power steering system of this embodiment.

In FIG. 1, a torque monitoring means 30, which is a redundant means constituting a second control means, monitors a driver's steering force and a motor current independently of a microcomputer 15 which serves as a first control means. A monitor drive logic producing means 31 determines an energizing or rotational direction of a motor 1 based on an output of the microcomputer 15 and an output of a torque monitoring means 30.

A relay 32 that serves as a switch means supplies an electric power to an H-type bridge circuit 12 or interrupts the electric power from the H-type bridge circuit 12.

Also, as shown in FIG. 2, a supply voltage detector circuit 33 divides a voltage VBM which is applied to a contact of the relay 32 to detect the supply voltage which is inputted to a CPU16 through an A/D convertor 21.

Also, there is provided between the motor 1 and a steering wheel (not shown), an electromagnetic clutch (not shown) for coupling or decoupling those members to or from each other. Reference numeral 34 in FIG. 1 denotes an exciting coil that drives the electromagnetic clutch. It should be noted that the clutch used between the motor and the steering wheel in this way may be of any type other than the electromagnetic type.

Also, an alarm lamp 35 that serves as an alarm means shown in FIG. 3 raises an alarm to the driver. A buffer 36 current-amplifies a signal input to an I/O port 20a for driving the relay 32, the coil and the alarm lamp 35.

Figure 4:
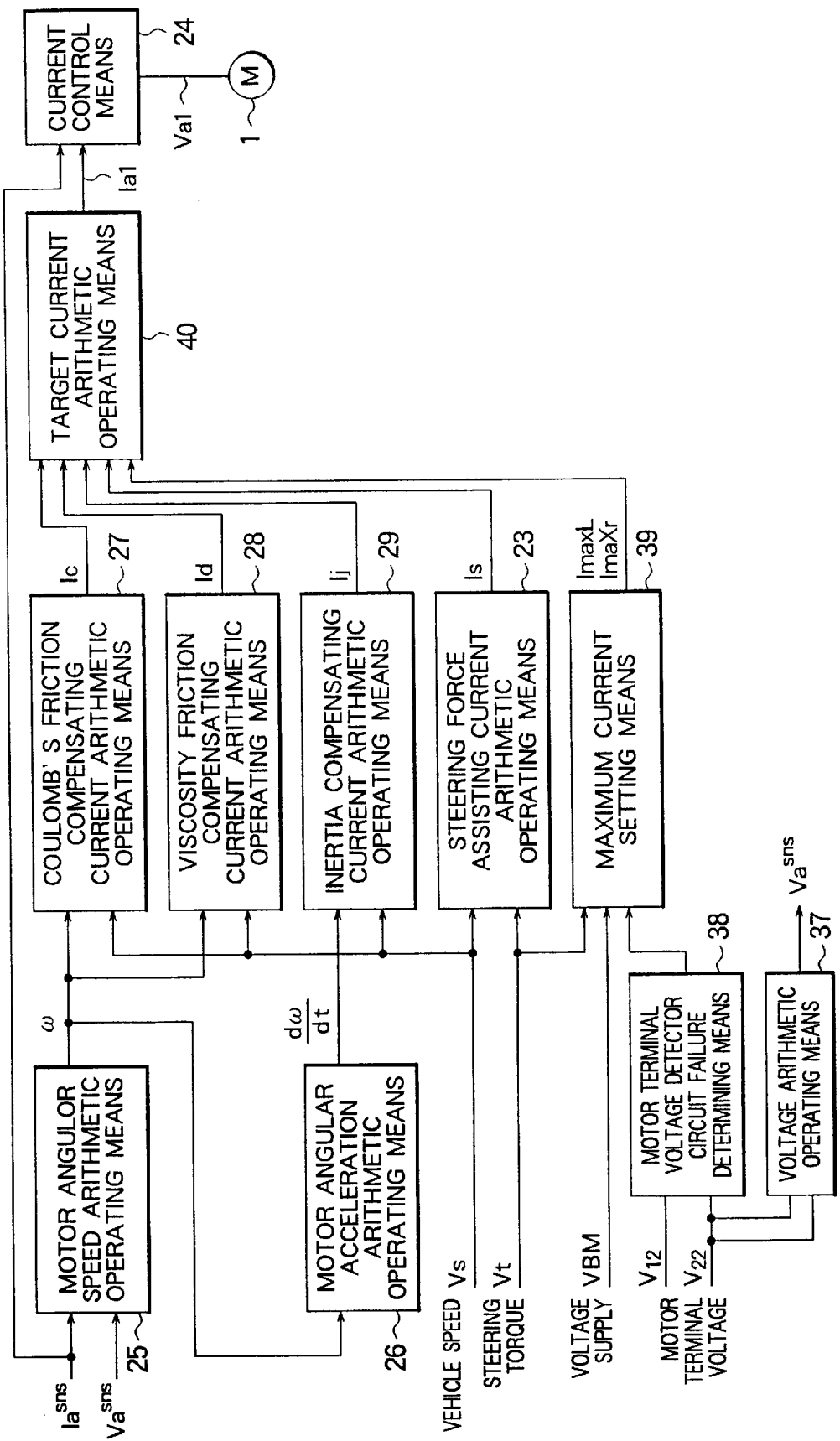
FIG. 4 is a functional block diagram showing the function of the electric power steering system according to the present invention.

FIG. 4 is a functional block diagram showing the function of the electric power steering system according to this embodiment.

In FIG. 4, the respective functional blocks perform their functions when a program stored in a ROM 17 is executed by the CPU 16. Therefore, the functions of the respective means are provided by the microcomputer 15 that serves as the first control means.

A motor terminal voltage arithmetic operating means 37 arithmetically operates or calculates a motor terminal voltage $Va^{sns}$ on the basis of output voltages V12 and V22 of a motor terminal voltage detector circuit 9. A motor terminal voltage detector circuit failure determining means 38 determines that the circuit shown in FIG. 1 is in failure in the case where the output voltages V12 and V22 of the motor terminal voltage detector circuit 9 are deviated from a predetermined voltage range.

A maximum current setting means 39 sets an upper limit of a current that flows through the motor 1 based on a detected steering force value Vt and a failure determining result of the motor terminal voltage detector circuit failure determining means 38 that serves a failure determining means.

A target current arithmetic operating means 40 arithmetically operates or calculates a third motor target current in the form of a motor target current Ia1 based on the respective target currents which includes a first motor target current in the form of a steering force assisting current target value Is, a second motor target current comprising a Coulomb's friction compensating current target value Ic, a viscosity friction compensating current target value Id and an inertia compensating current target value Ij, as well as upper limits ImaxL and ImaxR for the motor current which are set by the maximum current setting means 39.

It should be noted that ImaxL represents an upper limit of the current in the case where the motor assists the steering force in a left-hand or counterclockwise direction, and ImaxR represents an upper limit of the current in the case where the motor assists the steering force in a right-hand or clockwise direction.

Subsequently, the operation will be described with reference to FIGS. 1 to 4.

The terminal voltages V12 and V22 of the motor 1 are detected by the motor terminal voltage detector circuit 9, and then inputted to the CPU 16 through the A/D convertor 21 incorporated in the microcomputer 15, respectively.

Hereinafter, processing is conducted according to programs stored in the RON 17.

The motor terminal voltage arithmetic operating means 37 arithmetically operates or calculates the detected motor terminal voltage value $Va^{sns}$ as $Va^{sns}=V12-V22$, and then gives this value $Va^{sns}$ to the motor angular speed arithmetic operating means 25.

Hereinafter, as in the conventional system, the steering force assisting current target value Is is arithmetically operated or calculated by the steering force assisting current arithmetic operating means 23 that serves as the first arithmetic operating means, and also the Coulomb's friction compensating current target value Ic, the viscosity friction compensating current target value Id and the inertia compensating current target value Ij are arithmetically operated or calculated by the Coulomb's friction compensating current arithmetic operating means 27, viscosity friction compensating current arithmetic operating means 28 and the inertia friction compensating current arithmetic operating means 29 which serve as the second arithmetic operating means. Those respective values are inputted to the target current arithmetic operating means 40 that serves as the third arithmetic operating means.

The motor terminal voltage detector circuit failure determining means 38 determines whether the detected motor terminal voltage values V12 and V22 which are detected by the motor terminal voltage detector circuit 9 fall within an appropriate range (within a predetermined voltage range) or not.

Now, the operation of the motor terminal voltage detector circuit 9 will be described in more detail.

It is to be noted that since the motor terminal voltage V21, the detected motor terminal voltage value V22, the motor terminal voltage V11, and the detected motor terminal voltage value V12 are voltages detected by a pair of similar circuits within the motor terminal voltage detector circuit 9, the relation between V11 and V12 will be described.

The following relation is established between the motor terminal voltage V11 and the detected motor terminal voltage value V12. Therefore, the relational expressions between the detected motor terminal voltage value V12 and the detected motor terminal voltage value V22 are obtained by replacing V11 and V12 by V21 and V22, respectively, resistant values R11 and R12 by R21 and R22, respectively, and electrostatic capacity C11 by C21, in expressions (7) to (11) as stated below.

The detected motor terminal voltage value V12 is represented as follows:

$$V12=(R11{\times}R12{\times}V11+R12{\times}R13{\times}Vcc)/[(R11{\times}R12+R12{\times}R13+R13{\times}R11){\times}\{1+R11{\times}R12{\times}R13{\times}C11{\times}s/(R11{\times}R12+R12{\times}R13+R13{\times}R11)\}] \qquad (7)$$

where s is Laplacean, VB is a supply voltage, and Vcc is a reference voltage of the A/D convertor 21.

A voltage range which is given as the terminal voltage V11 is expressed as follows provided that a forward voltage across a parasite diode of a power MOSFET 13 is VF.

$$-VF \leq V11 \leq VB \qquad (8)$$

If the transient terms are ignored, a range of the detected motor terminal voltage value V12 is obtained from the expressions (7) and (8) as follows:

$$(-R11{\times}R12{\times}VF+R12{\times}R13{\times}Vcc)/(R11{\times}R12+R12{\times}R13+R13{\times}R11) \leq V12 \leq \{R11{\times}R12{\times}VB+R12{\times}R13{\times}Vcc\}/(R11{\times}R12+R12{\times}R13+R13{\times}R11)] \qquad (9)$$

Since the supply voltage VB and the forward voltage VF of the parasite diode of the power MOSFET 13 can be regarded as substantially constant values, the resistant values of the resistors 10a, 10b and 10c and the reference voltage Vcc become constant values provided that a temperature characteristic, etc., can be ignored. Therefore, from the expression (9) above, V12 becomes a value within the predetermined range.

Therefore, if V12 is deviated from the predetermined range which is determined according to the expression (9), it can be determined that the motor terminal voltage detector circuit 9 is in failure.

On the basis of the above principle, the motor terminal voltage detector circuit failure determining means 38 determines the failure of the motor terminal voltage detector circuit 9.

Figure 5:
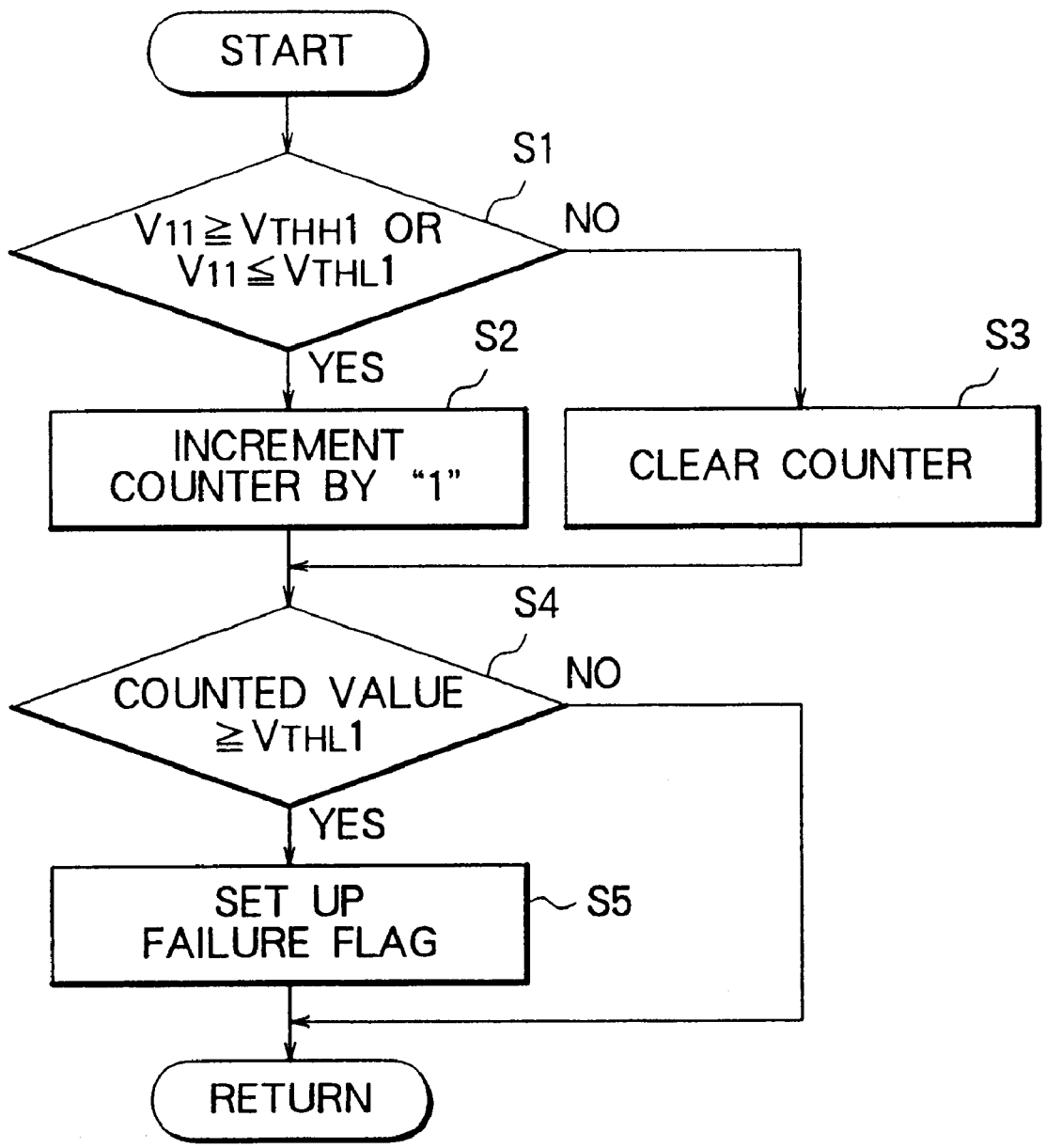
FIG. 5 is a flowchart representing the contents of operation of a motor terminal voltage detector circuit failure determining means in the electric power steering system according to the present invention.

FIG. 5 is a flowchart for explaining a flow of the failure determination of the motor terminal voltage detector circuit failure determining means 38 in the electric power steering system according to the present invention.

In this example, program represented by the flowchart shown in FIG. 5 is executed by the CPU 16 every given period.

In the following description, signs are given of the steering force and the motor current in such a manner that neutral is "0", and a positive sign and a negative sign are given when the steering wheel is steered clockwise and counterclockwise, respectively.

Since the motor terminal voltage detector circuits 9a and 9b have the same function and perform the completely identical failure detecting method with respect to each other, the failure detection by the motor terminal voltage detector circuit 9a alone will be described.

First, in step S1, it is checked whether V11 falls within a predetermined range, that is, $V_{THL}1<V11<V_{THH}1$, or not. If V11 is not within this range, a counter in the RAM 18 is increased by "1" in step S2. Also, if V11 is within the above range, the counter in the RAM 18 is cleared to "0" in step S3.

In step S4, the counter within the RAM 18 is a predetermined value $t_{TH}1$ or more, a failure flag which is set in the RAM 18 is set to "1" in step S5, whereas if the counter is lower than the predetermined value $t_{TH}1$, processing is returned to program that calls the subject program every given period.

The failure flag is designed such that it is cleared to "0" when the CPU 16 is reset by turning on the power supply of the electric power steering system, and as mentioned above, holds "1" until the power supply is interrupted after the failure flag is set to "1".

In this way, through the motor terminal voltage detector circuit failure determining means 38, in the case where the detected voltage of the motor terminal voltage detector circuit 9 is out of the predetermined range for a predetermined duration or longer, the predetermined flag disposed within the RAM 18 is set to "1" in such a manner that the failure determining result is held until the power supply of the electric power steering is interrupted.

The maximum current setting means 39 sets the upper limit which is permissible for the motor target current Ia1 on the basis of the above-mentioned failure determining result.

Hereinafter, the operation of the maximum current setting means 39 will be described in accordance with a flowchart shown in FIG. 6. The program shown in FIG. 6 is also called every given period.

Figure 6:
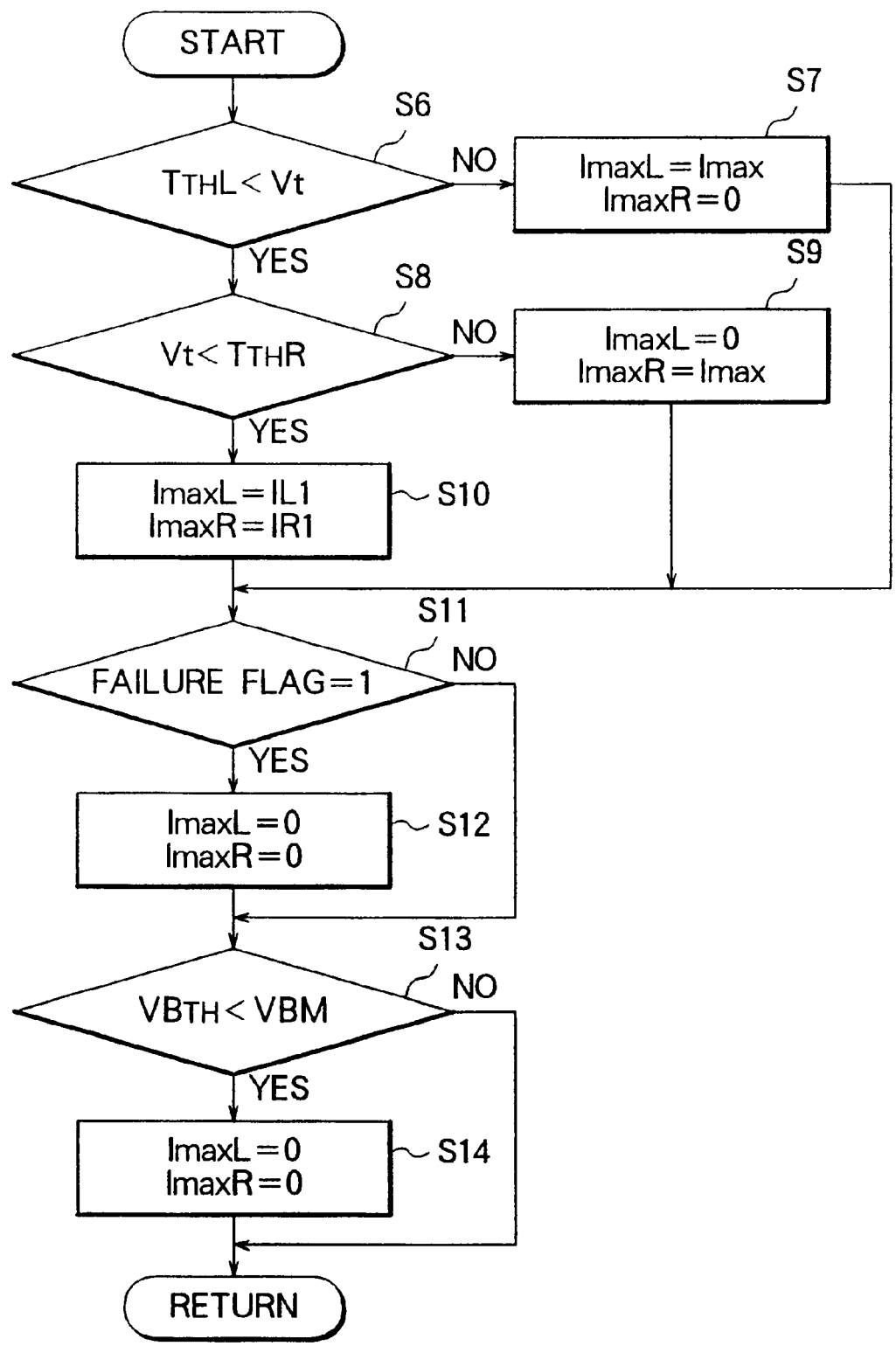
FIG. 6 is a flowchart representing the contents of operation of a maximum current setting means in the electric power steering system according to the present invention.

In FIG. 6, Imax represents a rated current of the motor 1, and the motor 1 is designed to output a maximum torque when Imax flows through the motor 1. ImaxL represents an upper limit of the current in the case where the motor 1 assists the steering force necessary when turning the steering wheel counterclockwise, and likewise ImaxR represents an upper limit of the current in the case where the motor 1 assists the steering force necessary when steering the steering wheel clockwise.

In steps S6 to S10, the maximum value of a current value supplied to the motor 1 is set in such a manner that excessive steering force assist is not conducted based on the detected steering force value Vt at the time of failure. The detected steering force value Vt is a force as detected with which the driver steers the steering wheel.

First, in step S6, it is determined whether the detected steering force value Vt is smaller than the predetermined value $T_{THL}$, or not.

As a result, if the detected steering force value is smaller, that is, if it is estimated that the driver steers the steering wheel counterclockwise with a steering force more than $T_{THL}$, the clockwise steering force assist is prohibited (that is, ImaxR=0) in step S7, and the maximum current which is permissible for the motor 1 is set (ImaxL=Imax) for counterclockwise steering force assist.

Then, in step S8, it is determined whether the detected steering force value Vt is larger than the predetermined value $T_{THR}$, or not.

As a result, if the detected steering force value is larger, that is, if it is estimated that the driver steers the steering wheel clockwise with a steering force more than $T_{THL}$, the counterclockwise steering force assist is prohibited (that is, ImaxR=0) in step S7, and the maximum current which is permissible for the motor 1 (ImaxL=Imax) is set in preparation for counterclockwise steering force assist.

As a result of the above, if it is determined that the steering wheel is steered neither counterclockwise nor clockwise in steps S6 and S8, it is estimated that the steering wheel is roughly in the vicinity of a neutral position. In this case, in step S10, the motor current is limited to the predetermined value or lower, resulting in ImaxL=IL1 and ImaxR=IR1.

Subsequently, the operation in steps S6 to S10 will be described with reference to FIGS. 7, 8 and 10.

Figure 7:
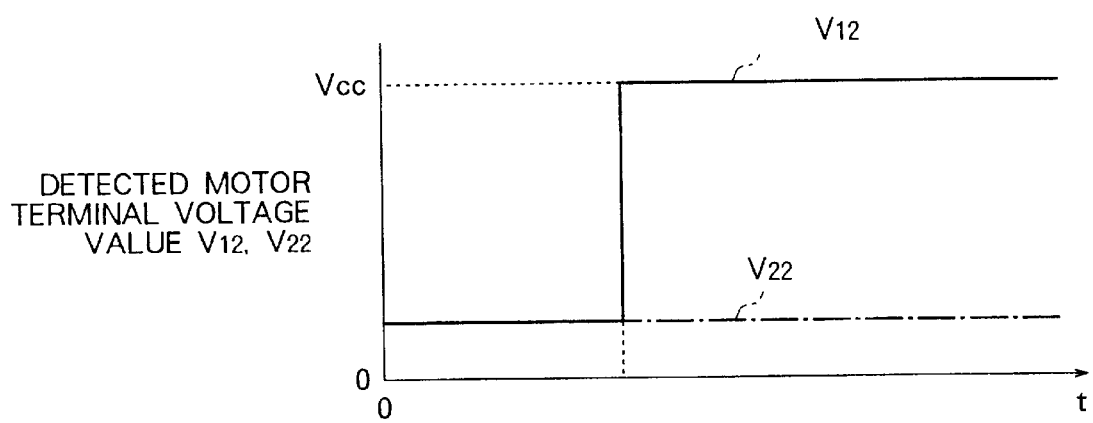
FIG. 7 is a graph representing the characteristic of a motor terminal voltage when a motor terminal voltage detector circuit is in failure in the electric power steering system according to the present invention.
Figure 8:
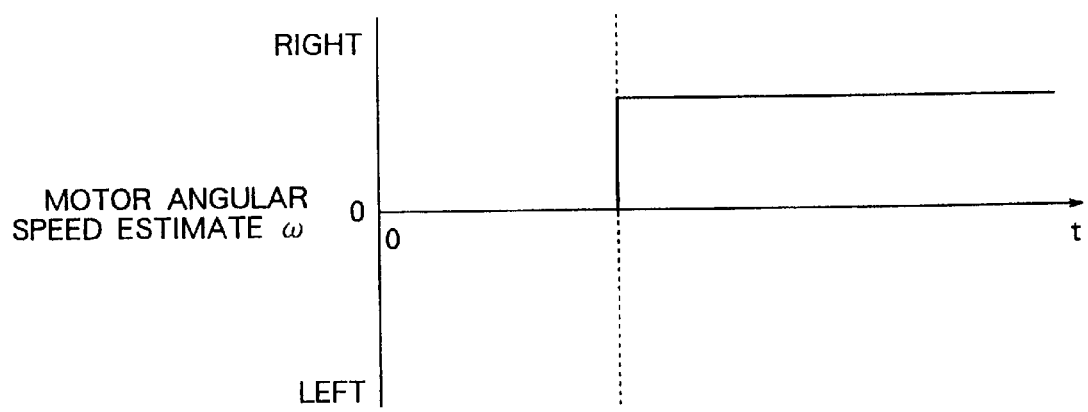
FIG. 8 is a graph representing the characteristic of a motor angular speed estimate when a motor terminal voltage detector circuit is in failure in the electric power steering system according to the present invention.
Figure 9:
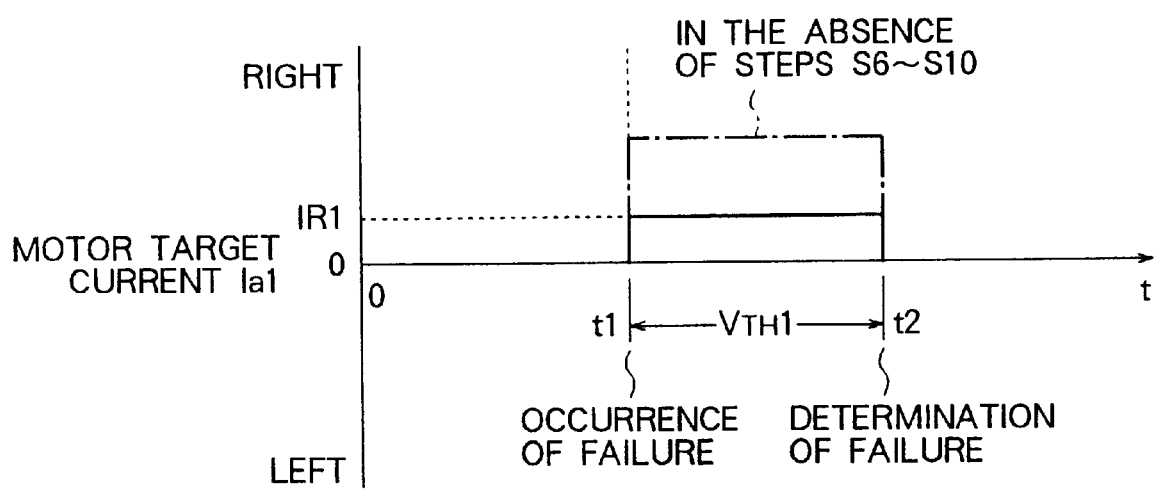
FIG. 9 is a graph representing the characteristic of a motor target current when a motor terminal voltage detector circuit is in failure in the electric power steering system according to the present invention.

FIGS. 7 to 9 are characteristic diagrams showing variations in a detected motor terminal voltage value, a motor angular speed estimate and a motor target current over time in the case where the motor terminal voltage detector circuit 9 is in failure when the vehicle is traveling while the driver holds the steering wheel at a neutral position.

In FIG. 7, at time t=0, a voltage corresponding to a voltage taken at the time when the steering wheel is at the neutral position is outputted as the terminal voltages V12 and V22 from the motor terminal voltage detector circuit 9, as represented by the following expressions (10) and (11).

$$V12=R12 \times Vcc/(R11+R12) \quad (10)$$

$$V22=R22 \times Vcc/(R21+R22) \quad (11)$$

In this situation, the motor angular speed estimate ω outputted from the motor angular speed arithmetic operating means 25 will be zero (ω=0).

Therefore, the motor 1 is not energized, and Ia1=0 is outputted from the target current arithmetic operating means 40.

At time t=t1, if the motor terminal voltage detector circuit 9a fails, the output voltage of the motor terminal voltage detector circuit 9 increases to V12=Vcc regardless of the fact that the steering wheel is at the neutral position. The failure of this type is estimated or assumed as, for example, the short-circuiting of the resistor 10a.

The motor angular speed arithmetic operating means 25 outputs a very high angular speed in a forward or clockwise direction as the motor angular speed estimate according to the expressions (5) and (6) (refer to FIG. 8).

Figure 18:
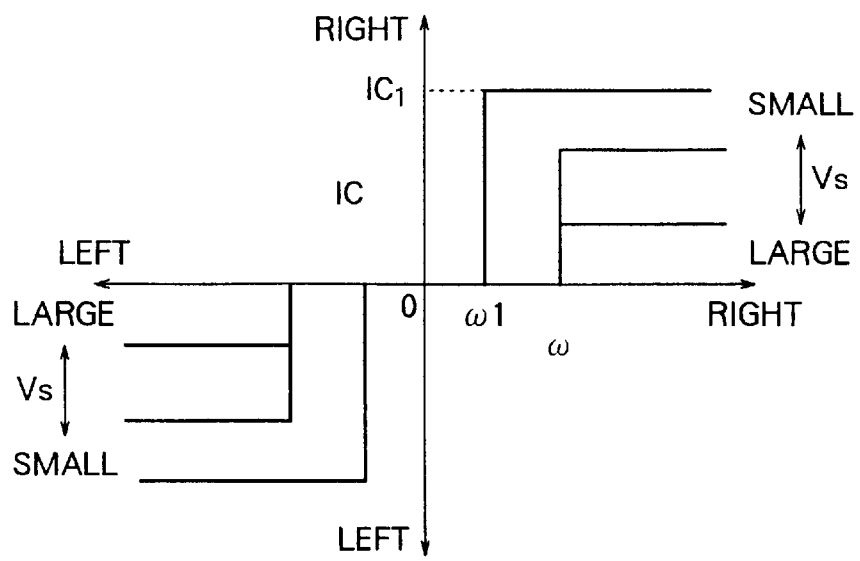
FIG. 18 is a diagram showing an example of a Coulomb's friction compensating current target value in the conventional electric power steering system.
Figure 19:
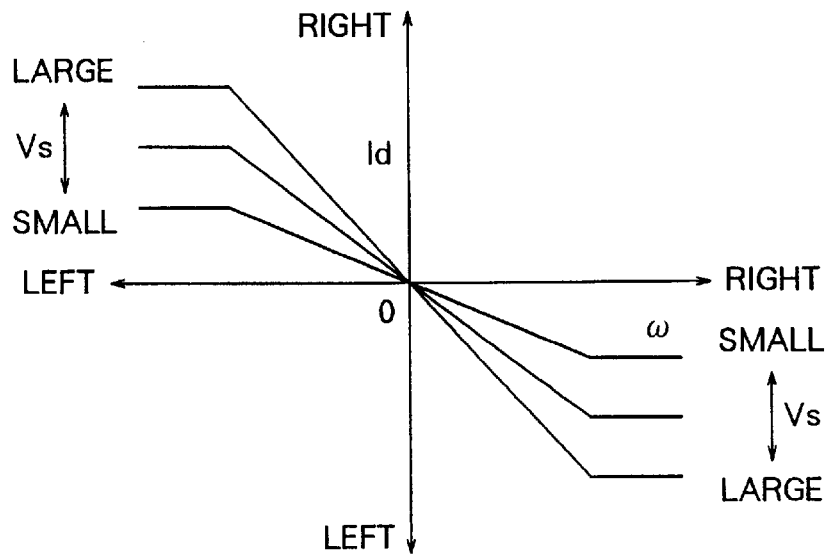
FIG. 19 is a diagram showing an example of a viscosity friction compensating current target value in the conventional electric power steering system.

Thus, the Coulomb's friction compensating current arithmetic operating means 27 and the viscosity friction compensating current arithmetic operating means 28 determine that the motor 1 rotates at a very high speed, and they output very large target currents Ic and Id, for example, according to the characteristics shown in FIGS. 18 and 19.

At the same time, the motor angular acceleration arithmetic operating means 26 outputs a very high angular acceleration in the forward or clockwise direction as the motor angular speed estimate dω/dt.

Figure 20:
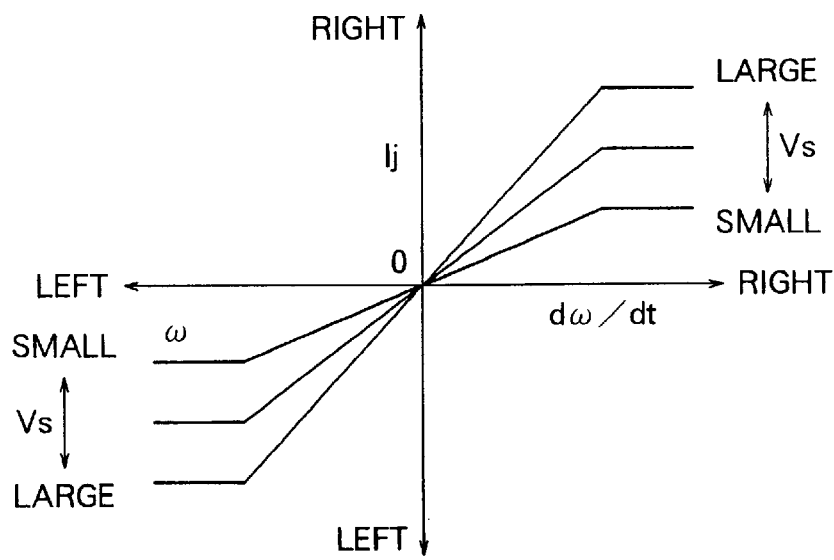
FIG. 20 is a diagram showing an example of an inertia compensating current target value in the conventional electric power steering system.
Figure 21:
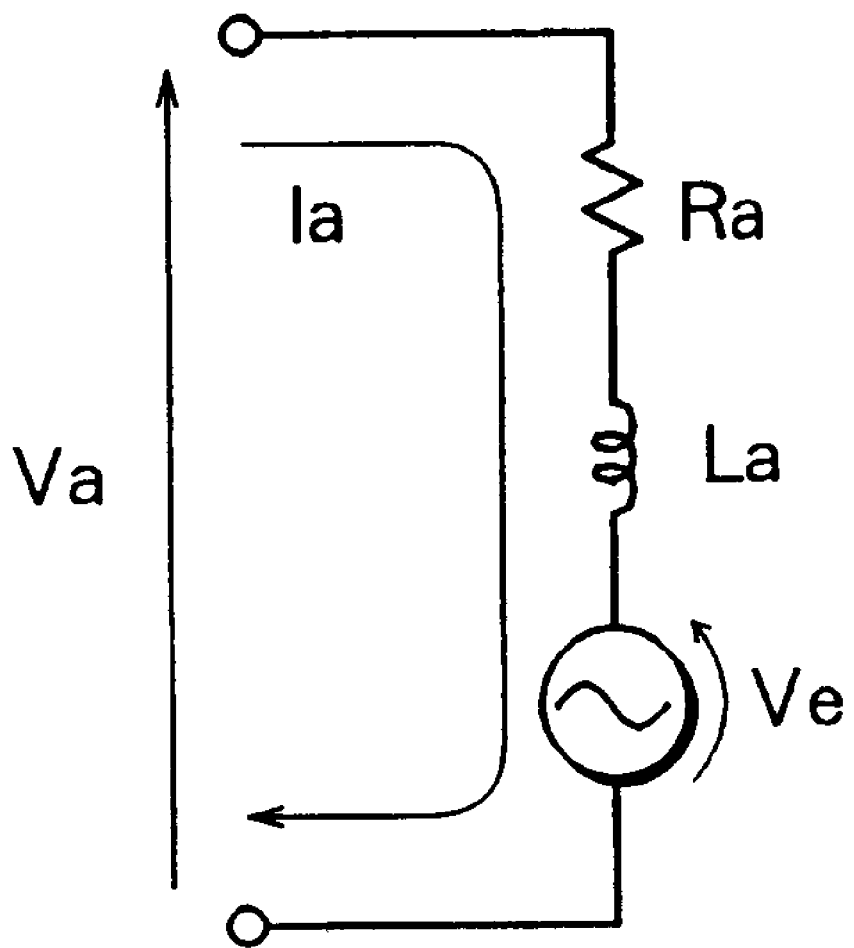
FIG. 21 is a diagram showing an equivalent circuit of an armature of a separately excited d.c. motor.

At this time, the inertia compensating current arithmetic operating means 29 determines that the motor 1 accelerates at a very high angular speed, and outputs a very large target current Ij, for example, according to the characteristic shown in FIG. 20.

The target current arithmetic operating means 40 arithmetically operates or calculates the motor target current Ia1 from the expression (1) according to the above calculation results.

As shown in FIG. 9, when the motor terminal voltage detector circuit 9 fails at the time t1, the target current Ia1 outputted from the target current arithmetic operating means 40 increases.

In other words, when the motor terminal voltage detector circuit 9 fails, there is a case in which the motor 1 is energized regardless of the fact that the driver holds the steering wheel at the neutral position.

Upon the completion of the failure determination due to the motor terminal voltage detector circuit failure determining means 38 at time t=t2, the motor current target value Ia1 is limited to an appropriate value in steps S11 to S12 which will be described later.

As mentioned above, even if the failure of the motor terminal voltage detector circuit 9 is detected, a current can flow in the motor 1 without any measure or remedy being taken against the failure until time t2 at which the failure determination is completed after the lapse of the predetermined time $T_{TH}1$.

In this situation, in FIG. 9, at time t between t1 and t2 (i.e., t1<t<t2), there is the possibility that the motor target current Ia1 is set to Imax as indicated by a dashed line, depending on the setting of Ic, Id and Ij.

However, if the motor 1 is not energized when the steering wheel is in the vicinity of the neutral position in order to prevent the above trouble, the steering feeling is degraded.

Therefore, as indicated in steps S6 to S10, at least in the case where the steering wheel is in the vicinity of the neutral position, if the current flowing through the motor 1 is limited to a predetermined value or less, the motor current is restricted at the time of failure so that the driver's steering is not obstructed. As a result, the steering feeling is improved, and an appropriate fail-safe measure against the failure can be provided.

Also, up to now, in the electric power steering system, as a safety enhancing technique, there has been known a measure that a redundant means is provided, independently of the main motor control means, for interrupting the H-type bridge circuit 12 so as to prevent the rotation of the steering wheel when it is determined that the steering wheel is not steered as a result of determining the driver's steering state on the basis of the output of the torque sensor.

Figure 10:
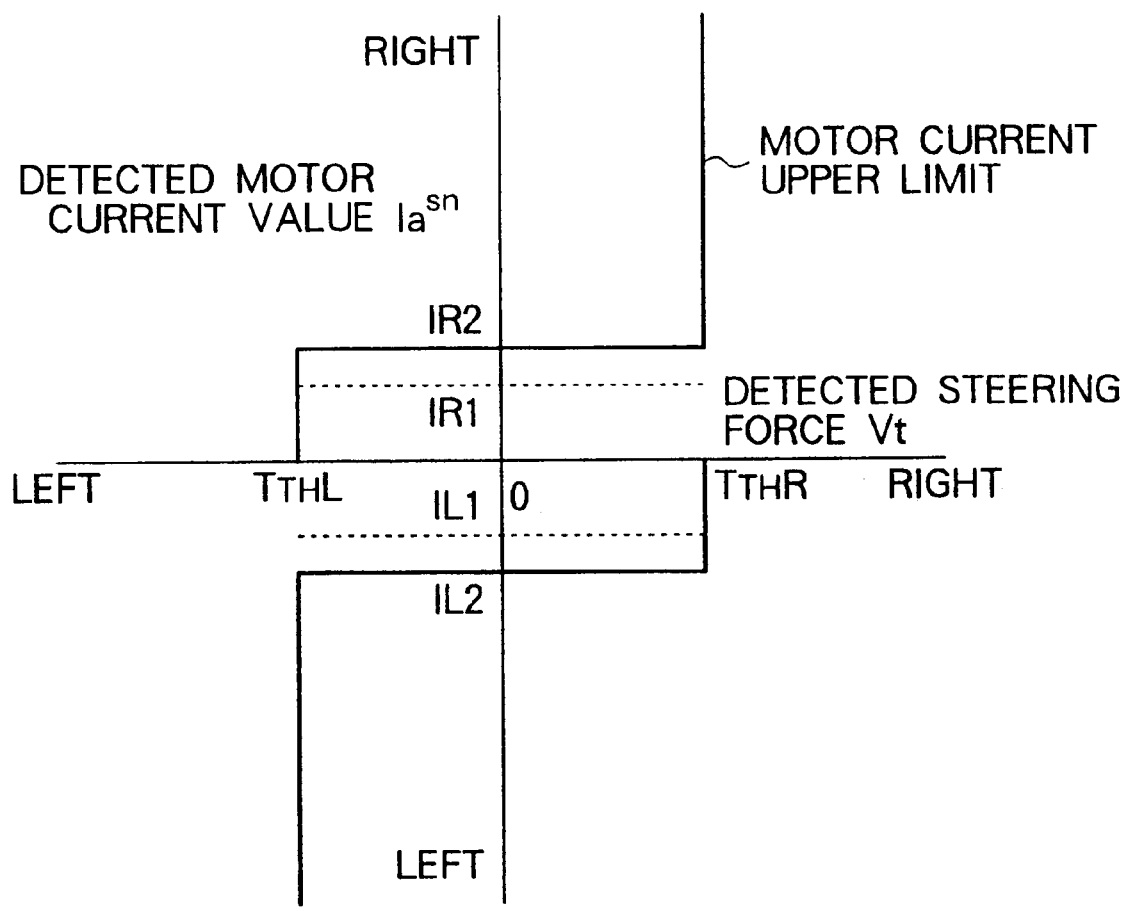
FIG. 10 is a diagram showing a method of setting an upper limit of a motor current in the electric power steering system according to the present invention.

As such a measure, there is a case where the upper limit of $Ia^{sns}$ to the detected steering force value Vt is set, for example, as shown in FIG. 10.

FIG. 10 is a characteristic diagram showing a detected motor current value versus a detected steering force value.

When the above redundant means allows the current to be restricted, the motor target current Ia1 and the detected motor current value $Ia^{sns}$ are not identical with each other. In this state, for example, when the current control means 24 controls the motor current in a feedback manner, for example, an integral control term increases up to the maximum value. This leads to an adverse effect that overshoot of the motor current occurs after the current limitation due to the redundant means is released, etc.

In order to prevent the above adverse effect, the upper limit IR1 due to the maximum current setting means 39 may be set to the upper limit IR1 or less by the redundant means in advance. With this, not only the driver's steering cannot be obstructed during failure, but also unnecessary operation of the redundant means can be prevented.

In steps S11 to S12, in the case where the motor terminal voltage detector circuit failure determining means 38 determines the occurrence of failure, the magnitude of current flowing through the motor 1 is restricted. First, in step S11, a flag is checked or referred to which holds the determination result of the motor terminal voltage detector circuit failure determining means 38.

If there is a failure determination, both of ImaxL and ImaxR are set to "0" in step S12. If not (i.e., no failure determination), processing is advanced to step S13.

In steps S13 to S14, when the supply voltage VB fluctuates, an erroneous or incorrect determination of the motor terminal voltage detector circuit failure determining means 38 is prevented.

First, the voltage of V12 for determining a failure will be described in more detail with reference to the expression (9).

In the vehicle equipment as in this embodiment, a power supply is a battery, and the supply voltage VB is normally within a range of about 12 to 14 (V). However, in the case where a surge voltage is applied to the battery, even if a surge absorber is provided, the supply voltage VB rises up to 20–30 (V).

In this case, there is the possibility that V12 and V22 exceed the failure determining threshold value that is the upper limit set according to the expression (9) regardless of the fact that the motor terminal voltage detector circuit 9 normally operates.

In order to prevent the above drawback, it is desirable that the supply voltage VB is read, and the power MOSFET 13 is suppressed from being rendered conductive when the surge voltage is being applied to the power supply, so that the surge voltage is prevented from being inputted to the motor terminal voltage detector circuit 9.

Subsequently, reverting to FIG. 6, the operation of the maximum current setting means 39 will be described. The voltage VBM after having passing through the relay is inputted to the A/D convertor 21 through the supply voltage detector circuit 33, and then inputted to the CPU 16 as a detected supply voltage value.

In step S13, it is checked whether VBM is larger than the voltage value VBTH which is taken n the case where the surge voltage is applied to the power supply, or not.

As a result, in case of $VB_{TH}$<VBM, both of ImaxL and ImaxR are set to "0" in step S14.

The current control means 24, which will be described in detail later, is set such that all the power MOSFETs 13a to 13d are turned off in case of the target current Ia1=0, whereby when a surge is applied to the supply voltage, such an excessive voltage as to cause an incorrect failure determination is precluded from being applied to the motor terminal voltage detector circuit 9.

In case of VBM≦$VB_{TH}$, the program is completed as it is.

With the above operation, even if a surge is applied to the power supply, the motor terminal voltage detector circuit failure determining means 38 can continue failure determination.

Figure 11:
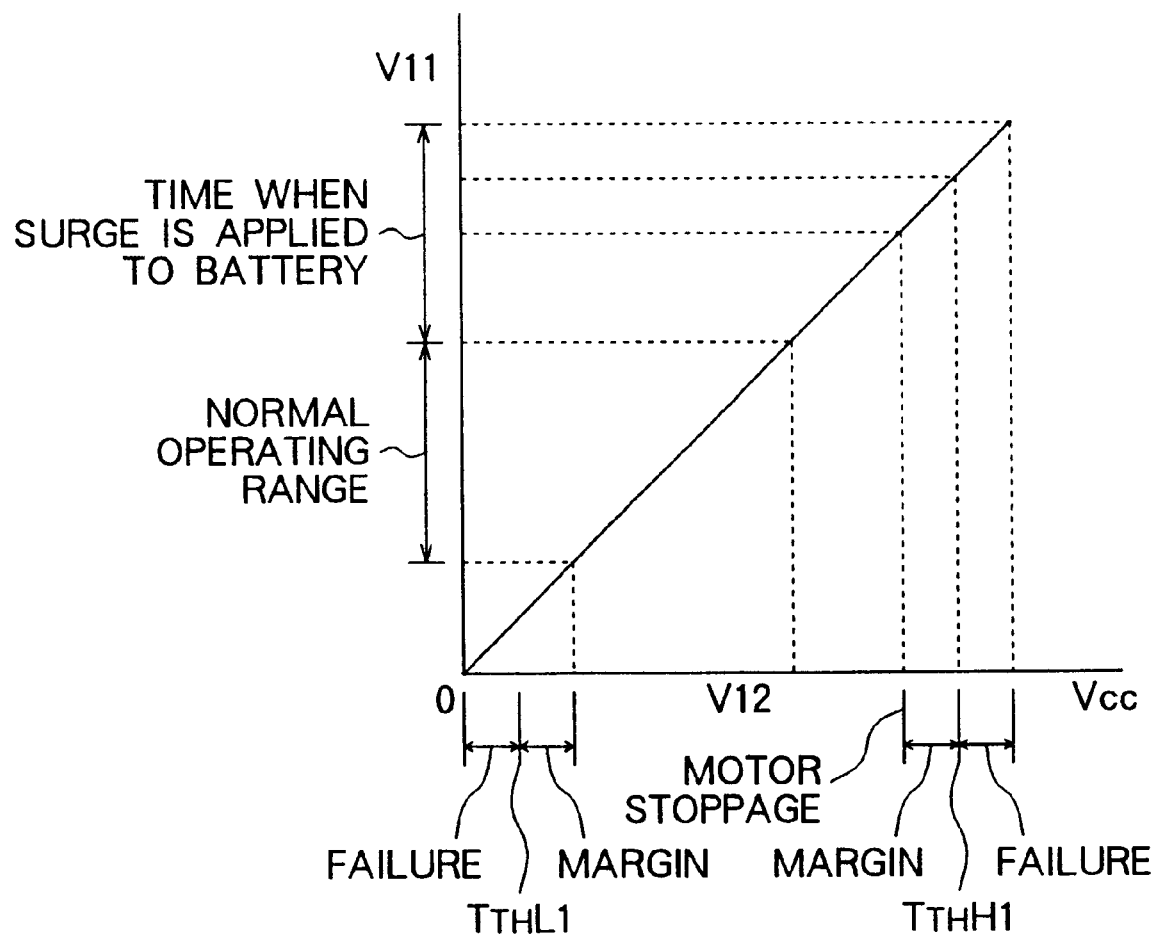
FIG. 11 is a graph representing a characteristic for setting a failure determining threshold value of the motor terminal voltage detector circuit in the electric power steering system according to the present invention.

FIG. 11 is a graph representing a characteristic for setting a failure determining threshold value of the motor terminal voltage detector circuit in the electric power steering system according to the present invention.

In FIG. 11, the failure determining threshold value $V_{THL}1$ is set to be lower so as to provide a margin of the lower limit of the normal operation range. Similarly, the failure determining threshold value $V_{THH}1$ is set to be higher so as to provide a margin of the voltage that stops the operation of the motor 1. These margins serve to prevent erroneous or incorrect failure determination due to influences of noise, the temperature characteristic, etc., of the elements employed.

The target current arithmetic operating means 40 arithmetically operates or calculates the target current that flows through the motor 1 based on Is, Ic, Id, Ij, ImaxL and ImaxR which have been arithmetically operated or calculated in the above manner, and it gives the target current thus calculated to the current control means 24.

Figure 12:
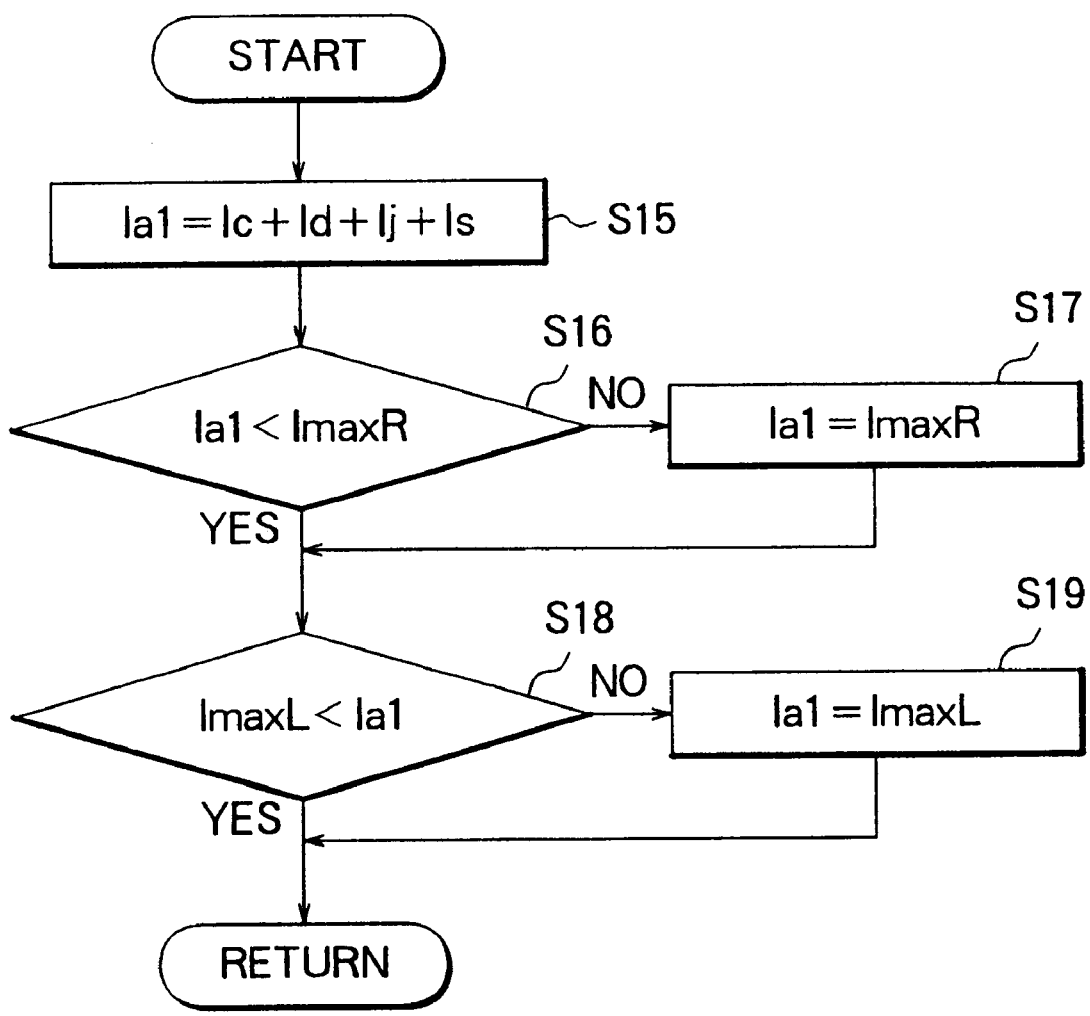
FIG. 12 is a flowchart representing the contents of operation of a target current arithmetic operating means in the electric power steering system according to the present invention.

Hereinafter, the operation of the target current arithmetically operating means 40 will be described with reference to a flowchart shown in FIG. 12.

First, in step S15, the respective control currents Is, Ic, Id and Ij are added together to arithmetically operate or calculate the target current Ia1.

Then, in steps S16 to S19, the upper limit of the motor current is set.

In step S16, the upper limit of the motor current and the target current for right-hand or clockwise steering are compared with each other.

It is determined whether the target current Ia1 arithmetically operated in step S15 is smaller than ImaxR which is set by the maximum current setting means 39 or not, and if ImaxR≦Ia1, the target current Ia1 is clipped to ImaxR n step S17.

In step S18, the upper limit of the motor current and the target current for left-hand or counterclockwise steering are compared with each other. If Ia1≦ImaxL, the target current Ia1 is clipped to ImaxL in step S19.

The current control means 24 operates such that the target current Ia1 calculated in the above manner becomes identical with $Ia^{sns}$ which is detected by the motor current detector circuit 6, as in the conventional example, and it arithmetically operates or calculates the supply voltage Va1 to the motor 1 to thereby drive the motor 1 through the H-type bridge circuit 12. In case of the target current Ia1=0, all the power MOSFETs 13a to 13d are turned off so that the power supply to the motor 1 is interrupted.

As described above, the motor 1 is driven to give the steering assisting force to the steering system while monitoring the failure of the motor terminal voltage detector circuit 9. If the motor terminal voltage detector circuit failure determining means 38 determines that the motor terminal voltage detector circuit 9 is in failure, a fail-safe proceeding or operation will be conducted as stated below.

First, as described above, the maximum current setting means 39 sets the target current Ia1 to "0", as a result of which the current control means 24 turns off all the power MOSFETs 13a to 13d.

At the same time, the CPU 16 drives the buffer 36 through the I/O port 20 so that the relay 32 is turned off, to thereby interrupt the power supply of the H-type bridge circuit 12. Also, the clutch coil 34 is turned off to mechanically separate the motor 1 from the steering system, and the alarm lamp 35 is turned on to raise an alarm, thereby announcing the driver of the fact that the power steering system is in failure.

In this way, the motor 1 is controlled on the basis of the counter electromotive voltage across the motor 1, and also an appropriate fail-safe proceeding or operation is conducted, thereby realizing the electric power steering system that can achieve both safety and good steering feeling.

Also, since the upper limit, which varies depending on the steering torque, is set for the motor target current, the motor current can be restricted until the fail-safe proceeding is conducted after occurrence of a failure without degrading the steering feeling, thereby providing for more improved safety.

In cases where failure determination is not made, an upper limit for the motor target current may simply be set.

Second Embodiment

In the maximum current setting means 39 according to the first embodiment, as shown in steps S6 to S10 of FIG. 6, an upper limit is set for a third motor target current in the form of the motor target current Ia1. However, in the second embodiment, an upper limit (ImaxL, ImaxR) is set in such a manner that any one or a total of the Coulomb's friction compensating current target value Ic, the viscosity friction compensating current target value Id and the inertia compensating current target value Ij, which serve as the second motor target current calculated on the basis of the motor angular speed estimate ω, is set to be lower than a predetermined value. Even in this case, as in the first embodiment, there can be obtained the effect of suppressing the rising of the motor current when the motor terminal voltage detector circuit 9 is in failure.

Furthermore, in the second embodiment, the upper limit of the motor target current may be varied on the basis of the detected steering force value Vt as in the first embodiment.

For example, if the upper limit of the motor target current is so set as to increase when the steering force is large, even though the steering wheel is rapidly reversed so that the steering force increases with the influence of the inertia moment of the motor 1, a satisfactory inertia compensating current Ij is allowed to flow through the motor 1 because of the increased upper limit, thereby further improving the steering feeling.

Alternatively, an upper limit for the motor angular speed estimate ω may be set only for a duration from the occurrence of failure to the completion of failure determination, that is, only for a duration $t_{TH}1$ within the duration of t1 to t2, with substantially the same effect of suppressing the motor current at the time when the motor terminal voltage detector circuit 9 is in failure.

In this example, since control based on the motor angular speed estimate ω can be sufficiently conducted at all times other than the time of failure, the steering feeling is further improved.

Moreover, as shown in step S11 to S12 of FIG. 6, the upper limit for the motor target current Ia1 is set when it is determined that the motor terminal voltage detector circuit 9 is in failure. Similarly, an upper limit may be set for any one of a total of the Coulomb's friction compensating current target value Ic, the viscosity friction compensating current target value Id and the inertia compensating current target value Ij, which serve as the control current calculated on the basis of the motor angular speed estimate ω.

In this case, since control based on the driver's steering force is continued after it is determined that the motor terminal voltage detector circuit 9 is in failure, a static steering force is not changed. Therefore, the steering force can be prevented from being rapidly changed due to the failure.

Also, it is needless to say that even if the above-mentioned clipping processing is conducted on the motor angular speed estimate ω, substantially the same effect can be obtained.

Further, it may be structured such that the motor angular speed estimate ω is allowed to temporarily exceed the upper limit.

With the above setting, for example, at the moment when the steering wheel is rapidly reversed, an inertia compensating current Ij sufficient for suppressing the influence of the inertia moment of the motor 1 can be supplied to the motor 1, thereby further improving the steering feeling.

A period of time during which the motor angular speed estimate ω is allowed to exceed the upper limit may be set to a period of time sufficient for improving the steering feeling (for example, 50 ms) from the viewpoint of safety.

Further, an upper limit may be set for the motor applied voltage Va1, so that the present invention is applicable even when the motor current is controlled in an open loop manner.

Third Embodiment

In the motor terminal voltage detector circuit failure determining means 38 according to the first embodiment, as shown in FIG. 5, it is determined whether the respective terminal voltages of the motor 1 are within a predetermined range or not. However, in a third embodiment of the invention, it may be structured such that failure determination may be conducted depending on whether the terminal voltage $Va^{sns}$ (=V12−V22) as a difference between the respective terminal voltages falls within a predetermined voltage range or not.

In the use of the electric power steering system, it is impossible to rotate the motor 1 at a high speed greater than a rotational speed under no load because such a high steering speed exceeds the limitation of the driver's steering speed.

Accordingly, since the counter electromotive voltage of the motor is always within the predetermined range, so far as the motor terminal voltage detector circuit 9 is in normal operation, $Va^{sns}$ (=V12−V22) output from the motor terminal voltage arithmetic operating means 37 also falls within the predetermined voltage range.

However, if the motor terminal voltage detector circuit 9a or 9b fails, thus causing V11 or V12 to be fixed to Vcc for example, the detected motor terminal voltage value $Va^{sns}$ increases to exceed the predetermined voltage range.

In this case, as in the first embodiment, it is determined that the motor terminal voltage detector circuit 9 is in failure.

The above-mentioned failure determining method particularly has no advantage in comparison with the method of the first embodiment in the case where $Va^{sns}$ is arithmetically operated or calculated through software as in the first embodiment. However, in the case where $Va^{sns}$ is arithmetically operated or calculated through hardware, there can be obtained an advantage that an addition of the motor terminal voltage detector circuit 9 or an increase in the number of channels of the A/D convertor 21 can be suppressed.

Figure 13:
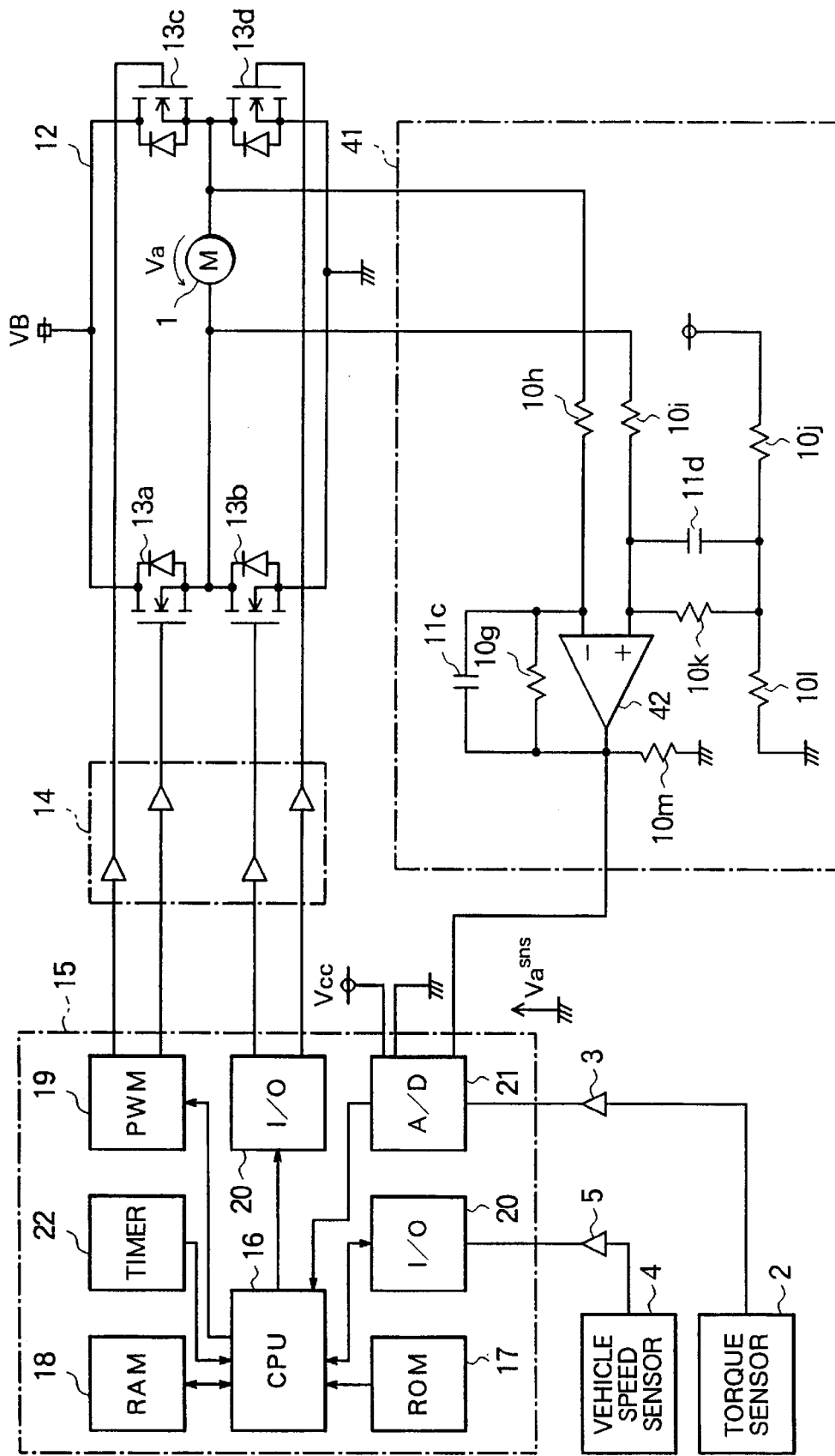
FIG. 13 is a circuit diagram schematically showing the structure of an electric power steering system according to another embodiment of the present invention.

FIG. 13 is a circuit diagram schematically showing the structure of an electric power steering system according to the third embodiment of the present invention.

In FIG. 13, a reference numeral 41 denotes a motor terminal voltage detector circuit that arithmetically operates or calculates the terminal voltage $Va^{sns}$ of the motor 1, and a reference numeral 42 denotes an operational amplifier.

The construction of this embodiment other than the above is substantially similar to the first and second embodiments and the aforementioned conventional example, and therefore identical or corresponding parts are denoted by like reference symbols and a description thereof is omitted.

In the motor terminal voltage detector circuit 41, for example, if a resistor 10 g is disconnected, the detected motor terminal voltage value $Va^{sns}$ rises up to the vicinity of the supply voltage of the operational amplifier 42, or lowers to the vicinity of the ground potential, so such a failure can be distinguished from the normal operation state thereof. Therefore, failure determination is carried out as in the first embodiment, while providing substantially the same failure determination.

Also, even if it is determined that failure occurs when the motor angular speed estimate ω is out of the predetermined range, the same effect can be obtained.

Fourth Embodiment

In the first embodiment, when the supply voltage VB rises, the power supply to the motor 1 is suspended or stopped so the failure determination of the motor terminal voltage detector circuit 9 is continued, but alternatively, it may be structured such that the failure determination of the motor terminal voltage detector circuit failure determining means 38 is suspended or stopped when the supply voltage VB is out of a predetermined range.

Figure 14:
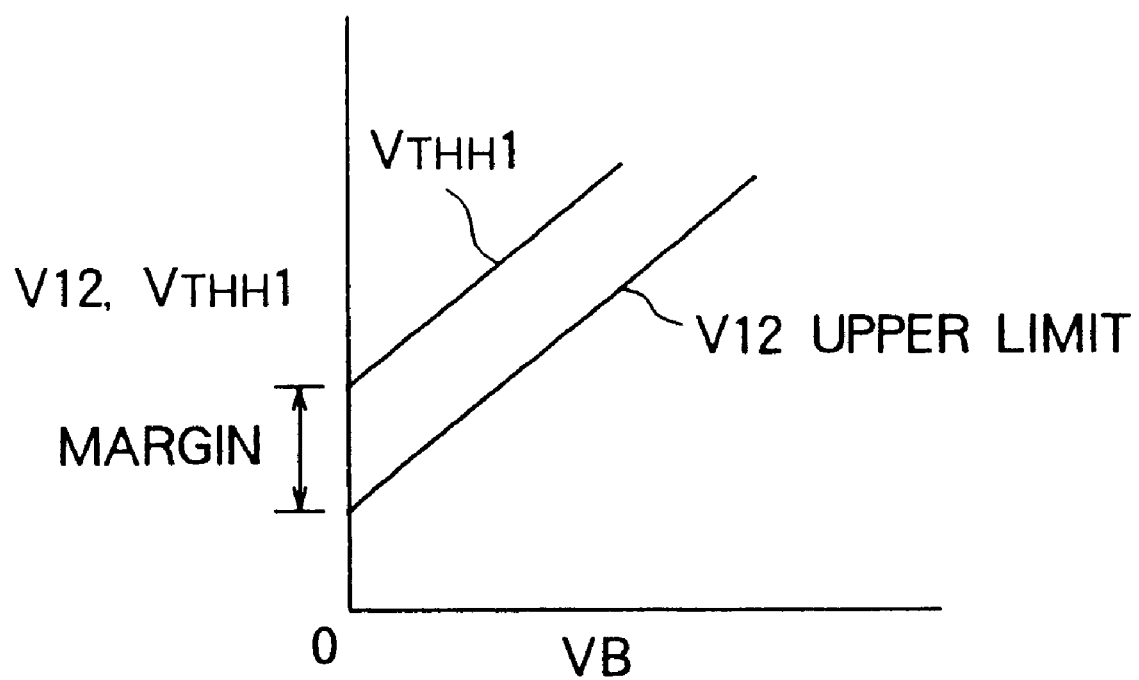
FIG. 14 is a graph representing an appearance of a variation in a failure determining threshold value to a supply voltage in the electric power steering system according to another embodiment of the present invention.
Figure 15:
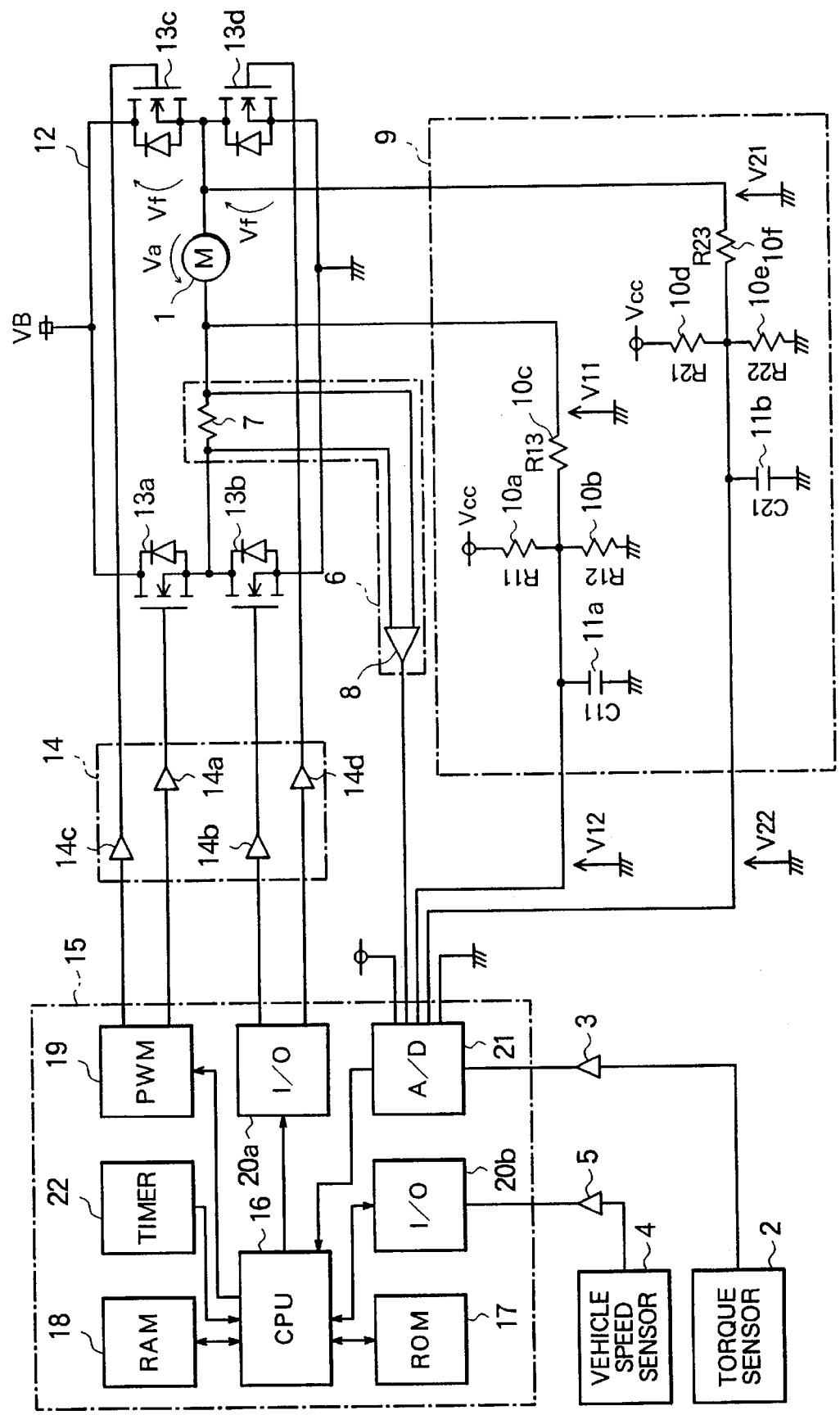
FIG. 15 is a circuit diagram schematically showing the structure of a conventional electric power steering system.
Figure 16:
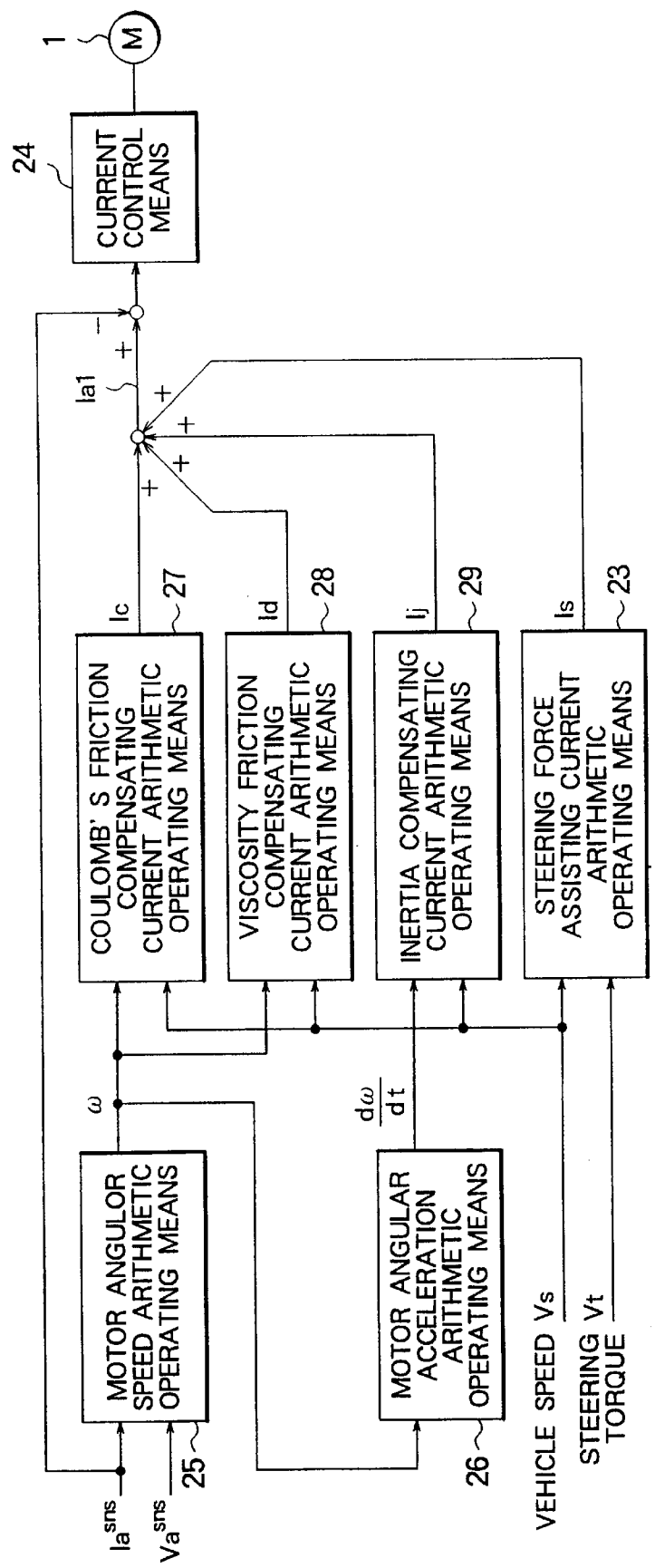
FIG. 16 is a functional block diagram showing the function of the conventional electric power steering system.
Figure 17:
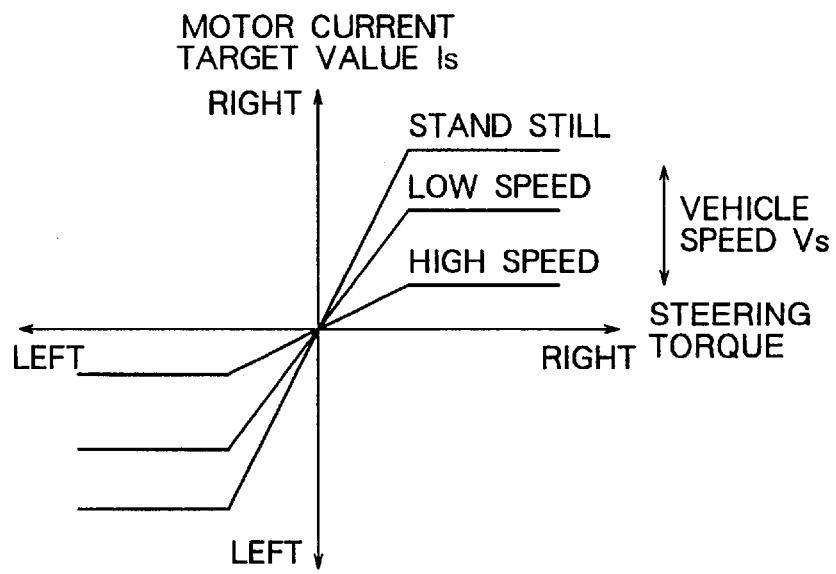
FIG. 17 is a diagram showing an example of a steering force assisting current target value in the conventional electric power steering system.

Moreover, as shown in FIG. 14, the failure determining threshold values $V_{THH}1$ and $V_{THL}1$ may be varied depending on the supply voltage VB on the basis of the above-mentioned expression (9). In this example, even in the case where a surge is applied to the supply voltage, failure determination can be continued while driving the motor 1.

The electric power steering system according to the present invention provides the following advantages.

The electric power steering system according to the present invention includes a first arithmetic operating means for arithmetically operating a first motor target current on the basis of at least a detected value of a driver's steering force; second arithmetic operating means for arithmetically operating a second motor target current determined on the basis of at least a counter electromotive voltage across a motor; third arithmetic operating means for arithmetically operating a third motor target current that flows through the motor for assisting the driver's steering force on the basis of the first motor target current and the second motor target current; and maximum current setting means for setting an upper limit of the second motor target current which is determined on the basis of the counter electromotive force across the motor. With this structure, the steering feeling can be improved, and also an excessive motor current does not flow in the motor even at the time of failure.

Also, in the electric power steering system according to the present invention, the maximum current setting means varies the upper limit of the second motor target current on the basis of the driver's detected steering force value. With this structure, the steering feeling can be further improved.

Further, the electric power steering system according to the present invention includes first arithmetic operating means for arithmetically operating a first motor target current on the basis of at least a detected value of a driver's steering force; second arithmetic operating means for arithmetically operating a second motor target current on the basis of at least a counter electromotive voltage across a motor; third arithmetic operating means for arithmetically operating a third motor target current that flows through the motor for assisting the driver's steering force on the basis of the first motor target current and the second motor target current; and maximum current setting means for setting an upper limit of the third motor target current; wherein the maximum current setting means varies the upper limit of the third motor target current on the basis of the detected steering force value. With this structure, the steering feeling can be further improved.

Still further, the electric power steering system according to the present invention includes first control means for determining a third motor target current that flows through the motor for assisting the driver's steering force from a first motor target current determined on the basis of at least a detected value of a driver's steering force and a second motor target current determined on the basis of at least a counter electromotive voltage across a motor, and for controlling driving of the motor; and second control means for controlling the motor on the basis of at least the detected value of the driver's steering force; wherein the first and second control means controls driving of the motor which assists the driver's steering force and sets an upper limit of the motor current which is set in the first control means to an upper limit or less of the motor current which is set in the second control means. With this structure, the steering feeling can be improved, and at the same time an excessive motor current does not flow in the motor even at the time of failure.

Moreover, in the electric power steering system according to the present invention, the upper limit of the motor current is replaced by an upper limit of a motor applied voltage. With this structure, even in the case where the motor current is controlled in an open loop, a fail-safe operation can be readily carried out.

Further, in the electric power steering system according to the present invention, the motor current or the motor voltage is allowed to exceed the upper limit within a predetermined period of time. With this structure, the steering feeling can be further improved.

Furthermore, the electric power steering system according to the present invention includes first arithmetic operating means for arithmetically operating a first motor target current on the basis of at least a detected value of a driver's steering force; second arithmetic operating means for arithmetically operating a second motor target current on the basis of at least a counter electromotive voltage across a motor; third arithmetic operating means for arithmetically operating a third motor target current that flows through the motor for assisting the driver's steering force on the basis of the first motor target current and the second motor target current; and failure determining means for determining failure when the motor terminal voltage is deviated from a predetermined range. With this structure, an appropriate fail-safe proceeding can be conducted even when the motor terminal voltage detector circuit fails.

Still further, the electric power steering system according to the present invention includes first arithmetic operating means for arithmetically operating a first motor target current on the basis of at least a detected value of a driver's steering force; second arithmetic operating means for arithmetically operating a second motor target current on the basis of at least a counter electromotive voltage across a motor; third arithmetic operating means for arithmetically operating a third motor target current for assisting the driver's steering force on the basis of the first motor target current and the second motor target current; and failure determining means for determining failure when a difference between the respective terminal voltages of the motor is deviated from a predetermined range. With this structure, an appropriate fail-safe proceeding can be conducted even when the motor terminal voltage detector circuit fails.

Moreover, in the electric power steering system according to the present invention, the failure determining means determines failure when the motor terminal voltage or a difference between the respective terminal voltages of the motor is deviated from the predetermined voltage range for a predetermined duration or longer. With this structure, incorrect determination of failure due to an influence of noises, etc., can be effectively prevented.

In addition, in the electric power steering system according to the present invention, the failure determining means does not conduct failure determination when a supply voltage which is applied to the motor is deviated from a predetermined voltage range. With this structure, incorrect determination of failure due to a fluctuation of the supply voltage can be effectively prevented.

Further, in the electric power steering system according to the present invention, the failure determining means prohibits the energization of the motor when a supply voltage which is applied to the motor is deviated from a predetermined voltage range. With this structure, incorrect determination of failure due to a fluctuation of the supply voltage can be effectively prevented.

Furthermore, in the electric power steering system according to the present invention, the failure determining means varies a predetermined voltage range in the failure determination according to a supply voltage which is supplied to the motor. With this structure, incorrect determination of failure due to a fluctuation of the supply voltage can be effectively prevented.

Moreover, in the electric power steering system according to the present invention, the failure determining means sets the upper limit of the second motor target current to nearly "0" and holds the upper limit as set when the failure determining means determines as being failure. With this structure, the driver's steering is not obstructed.

Still further, in the electric power steering system according to the present invention, the maximum current setting means sets the upper limit of the third motor target current to nearly "0" and holds the upper limit as set when the failure determining means determines failure. With this structure, the driver's steering is not obstructed.

Further, in the electric power steering system according to the present invention, the maximum current setting means sets the upper limit of the motor applied voltage to nearly "0" and holds the upper limit as set when the failure determining means determines failure. With this structure, the driver's steering is not obstructed.

In addition, in the electric power steering system according to the present invention, there are further provided a motor driver circuit and switch means disposed between a power supply and ground, and opens the switch means and holds this state when the failure determining means determines as being failure. With this structure, the driver's steering is not obstructed even when the above failure as well as the failure of the motor driver circuit fail at the same time.

Furthermore, in the electric power steering system according to the present invention, there is further provided clutch means for mechanically coupling the motor to the steering system or decoupling the motor from the steering system, wherein the failure determining means decouples the clutch means and holds this state when the failure determining means determines as being failure. With this structure, the driver is not adversely affected by the inertia moment of the motor during steering even at the time of failure.

Further, in the electric power steering system according to the present invention, there is further provided an alarm means for alarming to the driver, wherein the failure determining means raises an alarm to the driver when the failure determining means determines as being failure. With this structure, the driver's attention is called at the time of determining failure.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable those skilled in the art to utilize the invention in various embodiments and with various modifications as are suited to the particular use contemplated. It is intended that the scope of the invention be defined by the claims appended hereto, and their equivalents.

What is claimed is:

1. An electric power steering system comprising:

first arithmetic operating means for calculating a first motor target current on the basis of a detected value of a driver's steering force;

second arithmetic operating means for calculating a second motor target current on the basis of a counter electromotive voltage across a motor which assists the driver's steering force;

third arithmetic operating means for calculating a third motor target current to be supplied to said motor on the basis of said first motor target current and said second motor target current; and maximum current setting means for setting an upper limit for said second or third motor target current which is determined on the basis of the counter electromotive voltage across said motor.

2. An electric power steering system as claimed in claim 1, wherein said maximum current setting means varies the upper limit for said second or third motor target current on the basis of the detected value of the driver's steering force.

3. An electric power steering system as claimed in claim 1, wherein said upper limit for the motor current is replaced by a corresponding upper limit for a voltagesupplied to said motor.

4. An electric power steering system comprising:

first control means for determining a third motor target current to be supplied to a motor which assists a driver's steering force, based on a first motor target current which is determined on the basis of a detected value of the driver's steering force and a second motor target current which is determined on the basis of a counter electromotive voltage across said motor, so as to control said motor; and second control means for controlling said motor on the basis of the detected value of the driver's steering force;

wherein a first upper limit and a second upper limit for the third motor current are set in said first and second control means, respectively, with said first upper limit being equal to or less than said second upper limit.

5. An electric power steering system as claimed in claim 4, wherein said upper limits for the third motor current are replaced by corresponding upper limits for a voltage supplied to said motor.

6. An electric power steering system as claimed in claim 4, wherein the third motor current is allowed to exceed the upper limits within a predetermined period of time.

7. An electric power steering system as claimed in claim 5, wherein the motor voltage is allowed to exceed the upper limits within a predetermined period of time.

8. An electric power steering system comprising:
first arithmetic operating means for calculating a first motor target current on the basis of a detected value of a driver's steering force;
second arithmetic operating means for calculating a second motor target current on the basis of a counter electromotive voltage across a motor which assists the driver's steering force;
third arithmetic operating means for calculating a third motor target current to be supplied to said motor on the basis of said first motor target current and said second motor target current; and
failure determining means for determining a failure when a terminal voltage of said motor is deviated from a predetermined range.

9. An electric power steering system as claimed in claim 8, wherein said motor terminal voltage is replaced by a difference between the respective terminal voltages of said motor.

10. An electric power steering system as claimed in claim 8, wherein said failure determining means determines a failure when said motor terminal voltage or a difference between the respective terminal voltages of said motor is deviated from the predetermined voltage range for a predetermined period of time or longer.

11. An electric power steering system as claimed in claim 8, wherein said failure determining means does not conduct failure determination when a supply voltage applied to said motor is deviated from a predetermined voltage range.

12. An electric power steering system as claimed in claim 8, wherein said failure determining means prohibits the energization of said motor when a supply voltage applied to said motor is deviated from a predetermined voltage range.

13. An electric power steering system as claimed in claim 8, wherein said failure determining means varies the predetermined voltage range in failure determination according to a voltage supplied to said motor.

14. An electric power steering system as claimed in claim 8, wherein said failure determining means sets an upper limit for said second or third motor target current to nearly zero and holds the upper limit as set when said failure determining means determines a failure.

15. An electric power steering system as claimed in claim 8, further comprising a maximum current setting means setting the upper limit for said motor voltage to nearly zero and for holding the upper limit as set when said failure determining means determines a failure.

16. An electric power steering system as claimed in claim 8, further comprising a motor driver circuit and switch means disposed between a power supply and ground, and opens said switch means and holds this state when said failure determining means determines a failure.

17. An electric power steering system as claimed in claim 8, further comprising clutch means for coupling said motor to the steering system or decoupling said motor from the steering system, wherein said failure determining means interrupts said clutch means and holds this state when said failure determining means determines a failure.

18. An electric power steering system as claimed in claim 8, further comprising alarm means for alarming, wherein said failure determining means alarms the driver when said failure determining means determines a failure.

* * * * *